United States Patent
Lecoq et al.

(10) Patent No.: US 12,474,079 B2
(45) Date of Patent: Nov. 18, 2025

(54) THERMAL SYSTEM WITH EXHAUST HEAT EXCHANGER

(71) Applicant: Schlumberger Technology Corporation, Sugar Land, TX (US)

(72) Inventors: Olivier Lecoq, Clamart (FR); Matthieu Simon, Clamart (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/924,263

(22) Filed: Oct. 23, 2024

(65) Prior Publication Data

US 2025/0129965 A1   Apr. 24, 2025

Related U.S. Application Data

(60) Provisional application No. 63/695,563, filed on Sep. 17, 2024, provisional application No. 63/592,298, filed on Oct. 23, 2023.

(51) Int. Cl.
*F24F 12/00* (2006.01)
*F24F 5/00* (2006.01)
(Continued)

(52) U.S. Cl.
CPC .......... *F24F 12/003* (2013.01); *F24F 5/0046* (2013.01); *F24F 11/83* (2018.01);
(Continued)

(58) Field of Classification Search
CPC ........ F24F 12/003; F24F 11/83; F24F 5/0046; F24F 2110/10; F24F 2140/20; F24F 2005/0057
See application file for complete search history.

(56) References Cited

U.S. PATENT DOCUMENTS

| 4,062,489 A | 12/1977 | Henderson |
| 4,091,636 A | 5/1978 | Margen |

(Continued)

FOREIGN PATENT DOCUMENTS

| CN | 209726509 U | 12/2019 |
| EP | 3770514 A1 | 1/2021 |

(Continued)

OTHER PUBLICATIONS

"Micro channel heat exchangers", downloaded on Apr. 4, 2025 from the internet at [https://www.danfoss.com/en/products/dcs/heat-exchangers/micro-channel-heat-exchangers/#tab-overview], Danfoss, 7 pages.

*Primary Examiner* — Travis Ruby
(74) *Attorney, Agent, or Firm* — Jeffrey D. Frantz

(57) ABSTRACT

A thermal system for providing thermal conditioning to a facility includes a facility air circuit for circulating a facility air throughout the facility and a downhole fluid circuit for circulating a downhole fluid. The facility air circuit is thermally connected to a heat pump for exchanging heat with the facility air. The downhole fluid circuit includes the heat pump for exchanging heat with the downhole fluid, a main loop, including a borehole heat exchanger (BHE) for exchanging heat between the downhole fluid and a geological formation, and an exhaust loop including an exhaust heat exchanger coupled to an exhaust of the facility air circuit, wherein the exhaust loop is configured to circulate at least some of the downhole fluid through the exhaust heat exchanger to exchange heat between the downhole fluid and an exhaust flow of the facility air exhausted from the facility at the exhaust.

8 Claims, 13 Drawing Sheets

(51) Int. Cl.
*F24F 11/83* (2018.01)
*F24F 110/10* (2018.01)
*F24F 140/20* (2018.01)

(52) U.S. Cl.
CPC ... *F24F 2005/0057* (2013.01); *F24F 2110/10* (2018.01); *F24F 2140/20* (2018.01)

(56) References Cited

U.S. PATENT DOCUMENTS

| | | | | |
|---|---|---|---|---|
| 4,375,831 | A * | 3/1983 | Downing, Jr. | F25B 13/00 |
| | | | | 62/238.7 |
| 4,993,483 | A | 2/1991 | Harris | |
| 5,465,588 | A | 11/1995 | McCahill | |
| 6,233,951 | B1 | 5/2001 | Cardill | |
| 8,726,682 | B1 * | 5/2014 | Olson | F24F 5/0046 |
| | | | | 62/235.1 |
| 8,794,015 | B1 | 8/2014 | Dahlen | |
| 9,797,611 | B2 | 10/2017 | Gault | |
| 10,535,245 | B2 | 1/2020 | Callemo | |
| 12,181,179 | B2 | 12/2024 | Taras | |
| 2007/0151286 | A1 | 7/2007 | Park | |
| 2007/0235179 | A1 | 10/2007 | Phillips | |
| 2010/0108290 | A1 | 5/2010 | Maxwell | |
| 2011/0042057 | A1 | 2/2011 | Li | |
| 2011/0048037 | A1 | 3/2011 | Graslund | |
| 2011/0272117 | A1 * | 11/2011 | Hamstra | F24T 10/10 |
| | | | | 165/185 |
| 2012/0067300 | A1 | 3/2012 | Berrio | |
| 2012/0125019 | A1 | 5/2012 | Sami | |
| 2015/0033779 | A1 | 2/2015 | Seggerman | |
| 2015/0219365 | A1 | 8/2015 | Zaynulin | |
| 2015/0267941 | A1 | 9/2015 | Kato | |
| 2015/0292759 | A1 | 10/2015 | Ding | |
| 2016/0320097 | A1 | 11/2016 | Leiper | |
| 2017/0016653 | A1 | 1/2017 | Kim | |
| 2017/0138639 | A1 | 5/2017 | Andrews | |
| 2017/0314822 | A1 | 11/2017 | Wong | |
| 2018/0335219 | A1 * | 11/2018 | Callemo | F24F 5/0046 |
| 2021/0095896 | A1 | 4/2021 | Andrews | |
| 2021/0404696 | A1 | 12/2021 | Jacobi | |
| 2022/0400625 | A1 | 12/2022 | Gordon | |
| 2023/0349568 | A1 | 11/2023 | Nguyen | |
| 2025/0003602 | A1 | 1/2025 | Simppala | |
| 2025/0043962 | A1 | 2/2025 | Goransson | |

FOREIGN PATENT DOCUMENTS

| | | |
|---|---|---|
| EP | 3809050 A1 | 4/2021 |
| JP | 2013190202 A | 9/2013 |
| JP | 2013238371 A | 11/2013 |
| JP | 2013245874 A | 12/2013 |
| JP | 2014228238 A | 12/2014 |
| JP | 2015028418 A | 2/2015 |
| JP | 2015124918 A | 7/2015 |
| JP | 2015129616 A | 7/2015 |
| JP | 2018200168 A | 12/2018 |
| KR | 100926480 B1 | 11/2009 |
| WO | 2025059693 A1 | 3/2025 |

\* cited by examiner

THERMAL SYSTEM WITH EXHAUST HEAT EXCHANGER

CROSS REFERENCE TO RELATED APPLICATIONS

This application claims priority and the benefit of U.S. Patent Application No. 63/592,298, filed on Oct. 23, 2023, and U.S. Patent Application No. 63/695,563, filed on Sep. 17, 2024, which are hereby incorporated by reference in its entirety.

BACKGROUND OF THE DISCLOSURE

It is becoming ever more important to limit the emission of carbon dioxide, for example, in view of climate change. One particular approach has often been the efficient and renewable use of energy resources for human activities. For instance, heating and cooling systems for buildings and other facilities, whether industrial, commercial, or residential, may typically use a substantial amount of energy. Accordingly, optimizing heating and cooling systems to operate more efficiently and with renewable energy resources may be advantageous.

SUMMARY

In some embodiments, a thermal system for providing thermal conditioning to a facility includes a facility air circuit for circulating a facility air throughout the facility and a downhole fluid circuit for circulating a downhole fluid. The facility air circuit is thermally connected to a heat pump for exchanging heat with the facility air. The downhole fluid circuit includes the heat pump for exchanging heat with the downhole fluid, a main loop, including a borehole heat exchanger (BHE) for exchanging heat between the downhole fluid and a geological formation, and an exhaust loop including an exhaust heat exchanger coupled to an exhaust of the facility air circuit, wherein the exhaust loop is configured to circulate at least some of the downhole fluid through the exhaust heat exchanger to exchange heat between the downhole fluid and an exhaust flow of the facility air exhausted from the facility at the exhaust.

In some embodiments, a method of operating a thermal system includes circulating a facility air through a facility air circuit to thermally condition a facility based on exchanging heat between a heat pump and the facility air, exhausting at least some of the facility air from the facility as an exhaust flow of the facility air, passing the exhaust flow through an exhaust heat exchanger to exchange heat between the exhaust flow and a downhole fluid of a downhole fluid circuit to recover at least some heating or cooling of the facility air to the downhole fluid.

In some embodiments, a thermal system for providing thermal conditioning to a facility includes a facility air circuit for circulating a facility air throughout the facility and a downhole fluid circuit for circulating a downhole fluid. The facility air circuit is thermally connected to a heat pump for exchanging heat with the facility air. The downhole fluid circuit includes the heat pump for exchanging heat with the downhole fluid, a borehole heat exchanger (BHE) for exchanging heat between the downhole fluid and a geological formation, and an exhaust heat exchanger coupled to an exhaust of the facility air circuit and configured to exchange heat between the downhole fluid and an exhaust flow of the facility air exhausted from the facility at the exhaust. The downhole fluid circuit is configured to operate in a plurality of modes, including a first mode for exchanging heat between the geological formation via the BHE and the heat pump, a second mode for exchanging heat between the exhaust flow via the exhaust heat exchanger, the geological formation via the BHE, and the heat pump, a third mode for exchanging heat between the exhaust flow via the exhaust heat exchanger and the geological formation via the BHE, and a fourth mode for exchanging heat between the exhaust flow via the exhaust heat exchanger and the heat pump.

This summary is provided to introduce a selection of concepts that are further described in the detailed description. This summary is not intended to identify key or essential features of the claimed subject matter, nor is it intended to be used as an aid in limiting the scope of the claimed subject matter. Additional features and aspects of embodiments of the disclosure will be set forth herein, and in part will be obvious from the description, or may be learned by the practice of such embodiments.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which.

DETAILED DESCRIPTION

Figure 1A:
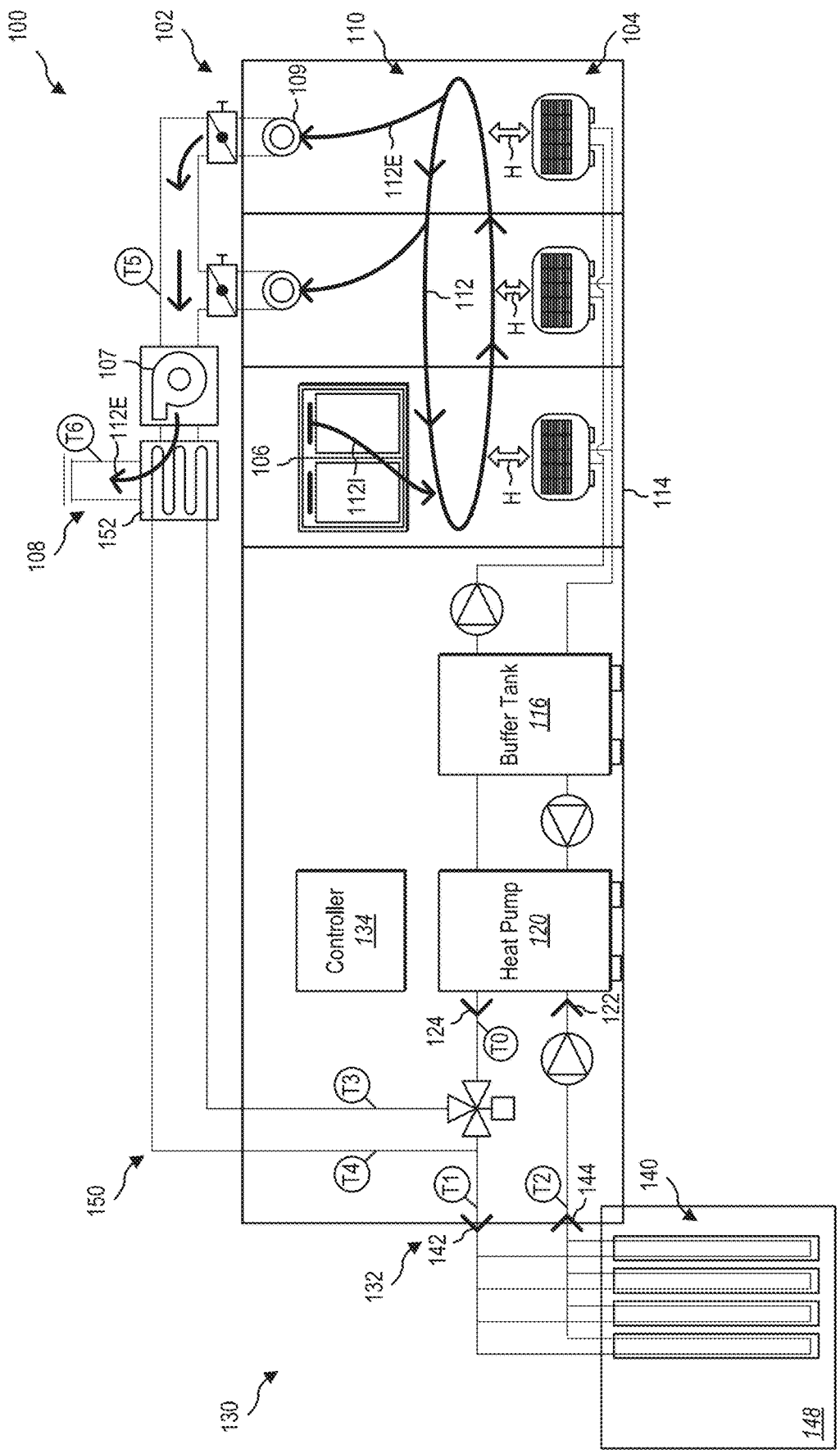
FIGS. 1A through 1D illustrate example schematic diagrams of a thermal system, according to one or more embodiments of the present disclosure.

This disclosure generally relates to a thermal system for providing heating and/or cooling to a facility. The thermal system is implemented to a heat pump which may exchange heat with one or more sources, including at least a ground source. The thermal system includes an energy recovery means for advantageously recovering energy from exhaust air that is exhausted from the facility. For example, a facility fluid, such as air or water, is circulated throughout the facility for thermally conditioning the facility, and the facility may accordingly be conditioned to a desired comfort temperature. In many cases, a certain amount of facility air is exhausted through an exhaust and replaced with fresh, outside air in order to maintain an indoor air quality. Exhausting conditioned exhaust air, however, represents inefficiencies in a thermal system, as the energy expended to condition the exhaust air is essentially lost or rejected from the system.

Accordingly, the thermal system(s) of the present disclosure include an exhaust heat exchanger for recovering at least some energy from the exhaust air. For example, the exhaust heat exchanger is coupled to the exhaust and facilitates heat transfer between the exhaust air and a downhole fluid. The downhole fluid can then be circulated (or recirculated) in the system for a variety of purposes, such as to exchange heat with the heat pump, exchange heat with a geological formation via a borehole heat exchanger (BHE) or both.

In this way, the thermal systems described herein may increase the thermal efficiency, reduce operational expense, reduce carbon emissions, etc. associated with heating and/or cooling the facility. For example, during cold (winter) months, heat that would otherwise be lost via the exhaust air to the surrounding environment can be reintroduced into the system, including injecting and storing heat in the ground for later use. Similarly, during warm (summer) months, thermal energy heat may be transferred to the exhaust air to reduce downhole fluid temperatures for heat transfer at the heat pump.

FIGS. 1A through 1D illustrate example schematic diagrams of a thermal system 100, according to one or more embodiments of the present disclosure. The thermal system 100 may be implemented to provide thermal conditioning (e.g., heating and/or cooling) to a facility 102. The facility 102 may be any structure, building, area, or space that may have one or more thermal loads, or which may require thermal conditioning. For instance, the facility 102 may be a building, group, or campus of several buildings, a warehouse, etc.

The thermal system 100 includes facility air 112 which may be circulated through the facility by one or more fans, pumps, or other motive devices. In some embodiments, the facility air 112 may be circulated in this way to thermally condition the facility, such as heating and/or cooling the facility. For example, the facility air 112 may be heated and/or cooled to a working temperature such that the facility air 112 may maintain one or more spaces or areas within the facility 102 at a given conditioned temperature or comfort temperature. For instance, in some cases, the facility air 112 may be at the comfort temperature of the facility 102.

The temperature of the facility, and therefore of the facility air 112 circulating therein, may be conditioned, managed, or maintained using a facility fluid (via a facility fluid circuit 114) that circulates through the facility in order to condition the facility so that the facility air 112 is at comfort temperature. The facility fluid may heat and/or cool the facility air via one or more facility heat exchangers 104, including by conduction or radiation. For example, the facility heat exchangers 104 may include radiators, heating panels (e.g., underfloor and/or ceiling heating and/or cooling panels) and the like for exchanging heat between the facility air 112 and the facility fluid. In some cases, the facility heat exchangers 104 may include air-to-liquid heat exchangers such as air handler units, fan coil units, terminal units, and the like for forcing and/or conducting a flow of the facility air 112 through the facility heat exchangers 104 to exchange heat therein. The facility heat exchangers 104 may be one or more heat exchangers that are positioned within, at, or on the facility 102 and through which the facility fluid may exchange heat to condition the facility air 112. For example, in some cases, various areas, rooms, or spaces of the facility 102 may have one or more facility heat exchangers. In this way, heat H may be exchanged between the facility fluid and the facility air 112 via the facility heat exchangers 104.

The facility 102 may include one or more air inlets 106. The air inlets 106 may provide a flow of outside air, fresh air, or makeup air to the facility as an inlet flow 112I of the facility air 112. For example, the air inlets 106 may include one or more windows, ducts, openings, channels, or other fluid conduit through which the inlet flow 112I may flow into the facility. The air inlets 106 may be implemented in connection with one or more fans or other mechanical equipment for providing the inlet flow 112I. The fresh air may be provided to the facility to maintain an air quality of the facility air 112. In some cases, the facility 102 includes one or more air inlets 106 in various areas, rooms, or spaces of the facility 102 in order to provide fresh air to those spaces. In some cases, the facility 102 may include one or more air inlets 106 in a mechanical room or other central location, such as having a single, central air inlet for providing fresh air to circulate through the facility 102.

In accordance with providing the inlet flow 112I through the air inlets 106, the facility may include one or more air outlets 109. The air outlets 109 may release, eject, or exhaust some of the facility air 112 from the facility 102 as an exhaust flow 112E of the facility air 112. For example, the air outlets 109 may be fluidly connected (e.g., through ductwork, etc.) to an exhaust 108 for exhausting the exhaust flow 112E out of the facility. The air outlets 109 and/or the exhaust 108 may be positioned at various locations of the facility 102, or in some cases may be in a mechanical room or other central location. In this way, the facility air 112 may circulate through the facility via the facility air circuit 110, the facility air 112 may be conditioned to maintain a thermal condition of the facility 102, and at least some of the facility air 112 may be exhausted and replaced to maintain an air quality of the facility with fresh, outside air. In some cases, the facility 102 includes an air extractor 107 for pumping, moving, extracting, or otherwise flowing the exhaust flow 112E out the outlets 109 and/or out the exhaust 108. For example, the air extractor 107 may be a fan, pump, or any other suitable fluid forcing device for moving the exhaust flow 112E. The air extractor 107 may be positioned on, at, or near the exhaust 108 for flowing the exhaust flow 112E out the exhaust.

As shown in the embodiment of FIG. 1A, the thermal system 100 includes a facility fluid circuit 114. The facility fluid circuit 114 may function to circulate the facility fluid to the one or more facility heat exchangers 104 to facilitate exchanging heat H between the facility air 112 and the facility fluid. For example, a heat pump 120 may be positioned on and/or connected to the facility fluid circuit 114 for heating and/or cooling the facility fluid. For instance, the facility fluid may exchange heat with one or more thermal sources through the heat pump 120 as described herein.

The heat pump may be a device or system for operating a refrigerant cycle to facilitate heat transfer between the facility fluid and a thermal source (e.g., one or more thermal sources). For example, the heat pump may have a first heat exchanger associated with the facility fluid and a second heat exchanger associated with the source. A working fluid may circulate through the heat pump 120 between the first and second heat exchangers to facilitate heat transfer between the facility fluid and the source. For example, the heat pump 120 may include one or more compressors and one or more expansion valves for facilitating heat transfer based on performing mechanical work on (e.g., compressing and expanding) the working fluid. The heat pump 120 may be a reversible heat pump in that the heat pump 120 may operate the refrigerant cycle in two different directions. In this way, the heat pump 120 may be configured to both provide heating (e.g., transferring heat from the source to the facility fluid) of the facility as well as cooling (e.g., transferring heat from the facility fluid to the source) of the facility.

In some embodiments, the thermal system 100 includes a buffer tank 116, for example, positioned on the facility fluid circuit 114. The buffer tank 116 may be a tank that contains a volume of the facility fluid which may effectively store thermal energy (e.g., as warm or cool fluid in accordance with an operating mode of the thermal system 100) for the facility fluid circuit 114 to draw upon to condition the facility 102.

In some embodiments, the facility air 112 may be the facility fluid. For example, the facility fluid circuit 114 may be implemented for circulating the facility air 112 throughout the facility 102, and the facility air 112 may interact more directly with the heat pump 120. For example, the facility air 112 may be circulated through a heat exchanger of the heat pump 120 to exchange heat therein and thus condition the facility air 112 for thermally conditioning the facility 102.

The thermal system 100 includes a downhole fluid circuit 130. The downhole fluid circuit 130 may circulate a downhole fluid for providing a thermal connection of the heat pump 120 with one or more thermal sources, as mentioned. For example, the thermal source may be a geological formation 148 which may provide a source of geothermal energy. For example, the geological formation 148 may be a formation or portion of the ground or subsurface, may include an underground resource such as a reservoir of water, gas, etc. may be a lake, river, aquifer, or may be any other geothermal energy source. The thermal properties of the geological formation 148 may be accessed by a borehole heat exchanger 140. For example, in some cases the borehole heat exchanger 140 may include one or more boreholes (e.g., a borefield) formed in the ground and/or in the geological formation 148. In an embodiment, the borefield includes one or more boreholes in a star-shaped configuration (i.e., inclined) so that the surface acreage needed for installing the borefield is reduced. The borehole heat exchanger 140 may also be implemented as one or more lines, fluid conduits, trenches, fluid inlets and/or outlets, or any other means for accessing the geothermal resources of the geological formation 148. For instance, the borehole heat exchanger 140 may be a device or system for circulating water from a lake or aquifer. In this way, the downhole fluid circuit 130 may include the borehole heat exchanger 140 for accessing the geological formation 148.

As mentioned, the downhole fluid circuit 130 may be connected to the heat pump 120, for example, via the second heat exchanger of the heat pump 120 as described above. The downhole fluid may circulate to and/or through the heat pump 120 in this way such that heat may be exchanged between the facility fluid and the downhole fluid via the heat pump 120. For example, heat may be transferred from the facility fluid to the downhole fluid and ultimately to the geological formation 148 in order to cool the facility fluid. Further, heat may be transferred to the facility fluid from the downhole fluid and ultimately from the geological formation 148 in order to heat the facility fluid. In this way, the thermal system 100 may be a geothermal heat pump or ground-source heat pump for providing heating and/or cooling to the facility based on extracting heat from or rejecting heat to the geological formation 148. In some cases, the thermal system 100 may include one or more other thermal sources, for example, in addition to the geological formation 148. For instance, the thermal system 100 may be equipped to exchange heat with an ambient air, such as through an air-source heat exchanger.

Figure 1B:
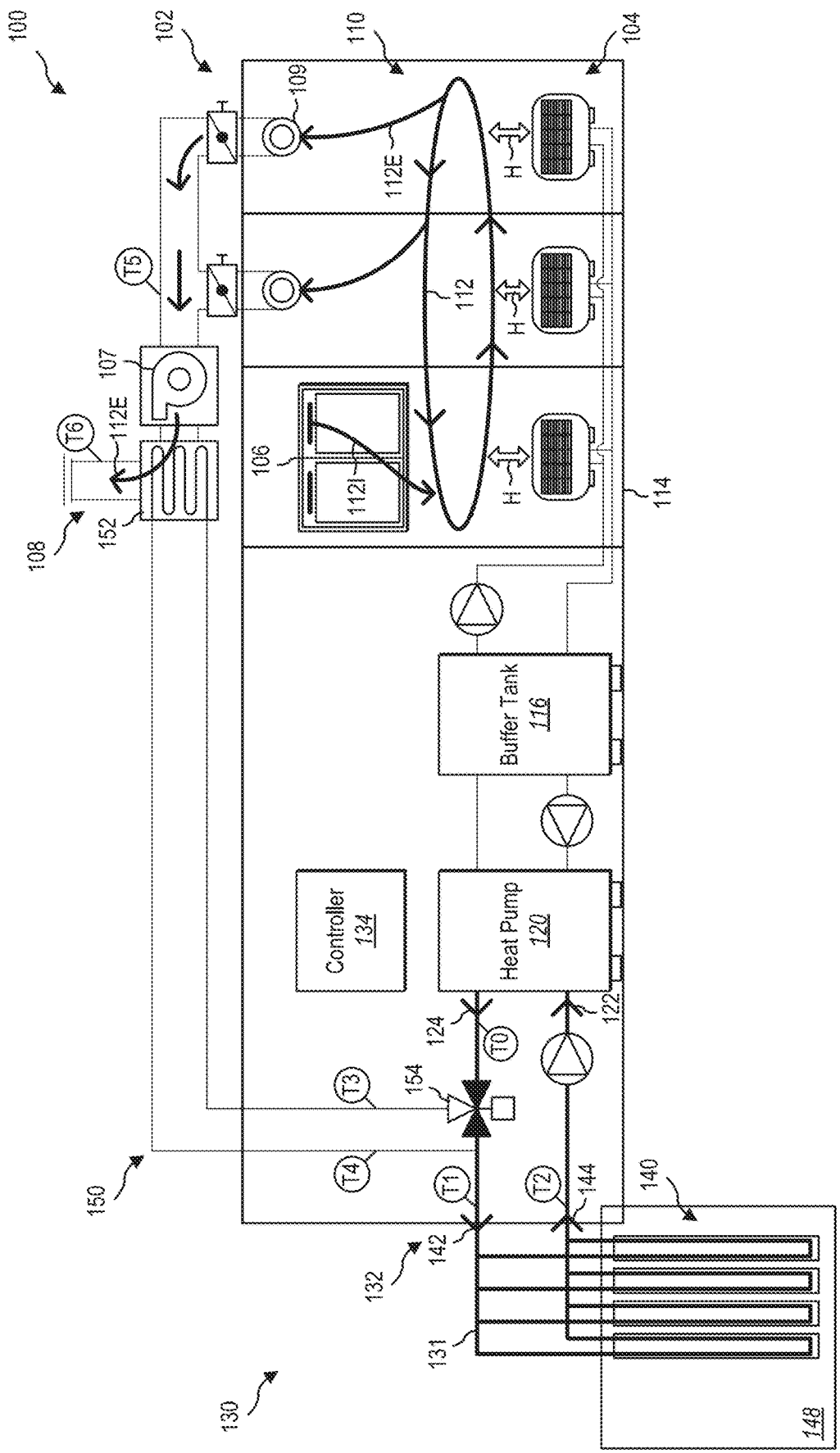

The borehole heat exchanger 140 may be connected to the heat pump 120 via a main loop 132 of the downhole fluid circuit 130. For example, an outlet 144 of the borehole heat exchanger 140 may be connected to an inlet 122 of the heat pump 120, and an inlet 142 of the borehole heat exchanger 140 may be connected to an outlet 124 of the heat pump 120. In this way, as shown in FIG. 1B, the downhole fluid 131 may flow from the outlet 144 of the borehole heat exchanger 140 to the inlet 122 of the heat pump 120 through the main loop 132. Similarly, the downhole fluid 131 may flow from the outlet 124 of the heat pump 120 to the inlet 142 of the borehole heat exchanger 140 through the main loop 132. In this way, the downhole fluid 131 may facilitate exchanging heat between the geological formation 148 and the heat pump 120, for example, for leveraging the geological formation 148 as a thermal source for providing heating and/or cooling to the facility 102.

Figure 1C:
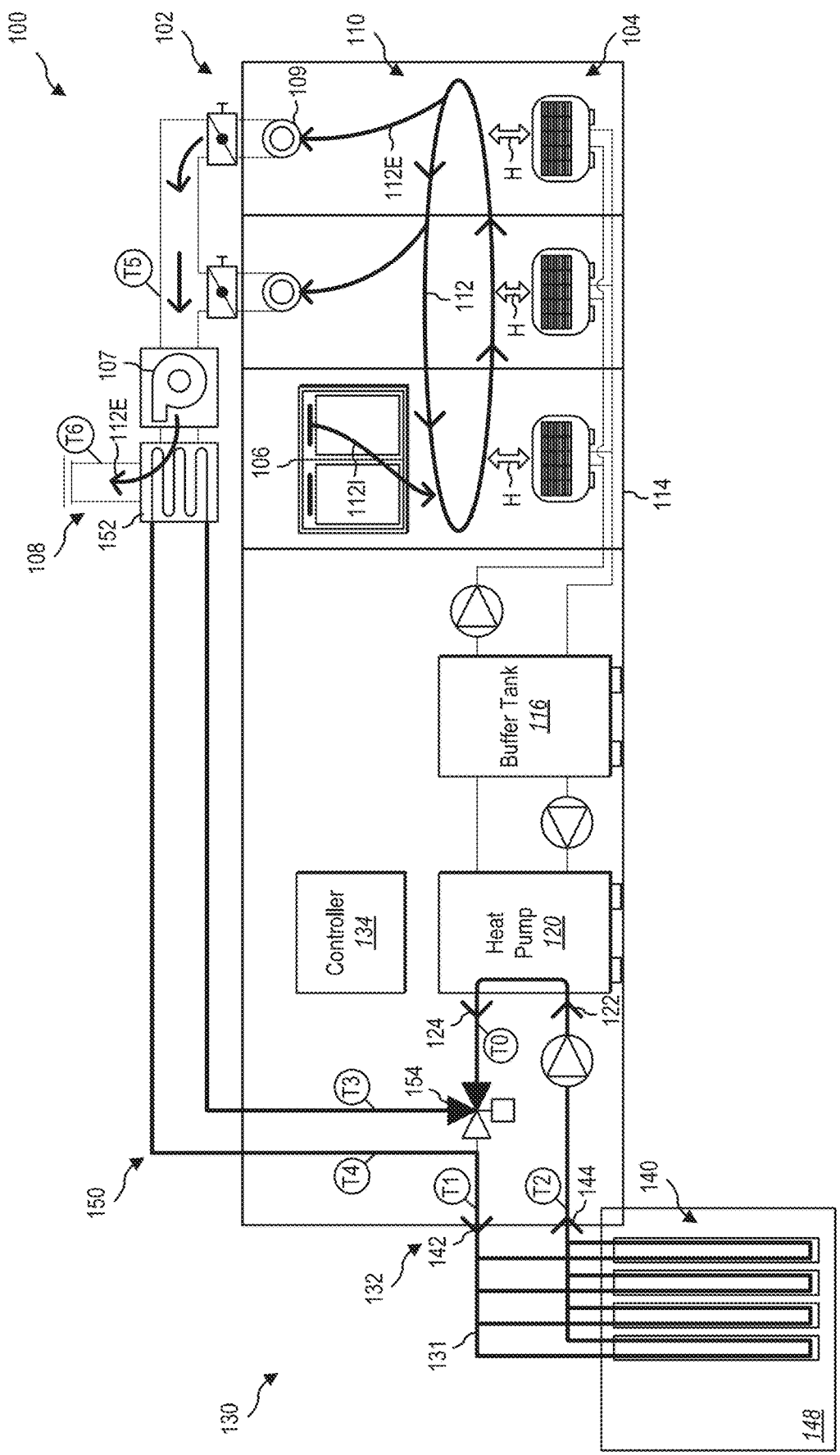

With reference now to FIG. 1C, as mentioned, the inlet flow 112I may be introduced to the facility at the air inlets 106 and the exhaust flow 112E may be exhausted from the facility 102 at the exhaust 108. In some cases, the inlet flow 112I (e.g., an ambient air) may be at a different temperature than the temperature of the facility 102 and/or the exhaust flow 112E, which may typically be at the comfort temperature of the facility 102. For instance, in the winter, it may be the case that the exhaust flow 112E is warmer than the outside air of the inlet flow 112I. As an example, in the winter the inlet flow 112I (e.g., the ambient or environmental temperature) may be from about −10° C. to about 19° C. (or other temperature), and the comfort temperature of the facility 102 may be from about 17° C. to about 24° C. (or other temperature) such that the exhaust flow 112E is at or near the comfort temperature. Similarly, in the summer, the exhaust flow 112E may be exhausted from the facility 102 to an environmental temperature that is higher than the comfort temperature of the facility 102. As an example, in the summer the inlet flow 112I (e.g., the ambient or environmental temperature) may be from about 19° C. to about 35° C. (or other temperature), which may be warmer than the comfort temperature of about 17° C. to about 24° C. Accordingly, the thermal system 100 may expend energy (e.g., electricity) via the heat pump 120 and other components to heat or cool the facility air 112, both to accommodate the different temperature of the inlet flow 112I, as well as to counteract thermal losses of the facility to the ambient environment. Thus, the exhaust flow 112E being exhausted from the facility 102 at or near the comfort temperature may represent a loss of energy by the thermal system 100 that was expended to heat or cool the facility fluid. Such may come at a significant cost to the efficiency of the thermal system, which may account for increased energy usage, operational costs, and carbon emissions.

In some cases, the exhaust heat exchanger 152 may be implemented in situations where the facility 102 is not provided with thermal conditioning, such as in implementations where the thermal system 100 does not provide cooling to the facility 102 (e.g., during summer months). In such cases, facility air 112 and the exhaust flow 112E may be similar to, or the same as, the ambient temperature. The exhaust heat exchanger 152 may be implemented to extract heat from the ambient air and/or the exhaust flow 112E to store the heat in the geological formation 148, for example, for use during colder months.

In some embodiments, the thermal system 100 includes an exhaust heat exchanger 152. The exhaust heat exchanger 152 may be coupled to the exhaust 108 such that the exhaust heat exchanger 152 is in thermal communication with the exhaust flow 112E. For example, the exhaust heat exchanger 152 may be connected to or at the exhaust 108 such that the exhaust flow 112E flows to, through, past, around, or otherwise interacts with the exhaust heat exchanger 152 to exchange heat therein.

The downhole fluid circuit 130 may include an exhaust loop 150 for connecting the exhaust heat exchanger 152 to the downhole fluid circuit 130. For example, the exhaust loop 150 may be connected to the main loop 132 in one or more configurations as described herein. As shown in FIG. 1B, the exhaust heat exchanger 152 may be connected to the downhole fluid circuit 130 and the downhole fluid 131 may flow through the exhaust heat exchanger 152. For example, in some cases all of the downhole fluid 131 flows through the downhole fluid circuit 130 and exhaust heat exchanger 152. In some cases, a portion of the downhole fluid 131 flows through the exhaust heat exchanger 152.

The exhaust heat exchanger 152 may be connected to the downhole fluid circuit 130 in this way such that heat may be exchanged between the exhaust flow 112E and the downhole fluid 131 at the exhaust heat exchanger 152. The heat transfer between the exhaust flow 112E and the downhole fluid 131 in this way may facilitate recovering at least some of the energy expenditure associated with conditioning the exhaust flow 112E. For example, when the facility air circuit 110 is implemented to heat the facility 102, the facility air 112 may be heated to a comfort temperature. As the exhaust flow 112E is exhausted from the facility at the exhaust 108, heat may be transferred from the exhaust flow 112E to the downhole fluid 131 at the exhaust heat exchanger 152. That heat may be returned to the geological formation 148 and/or the heat pump 120 for implementing (e.g., immediately or at a later time) for further heating the facility 102. As another example, when the facility air circuit 110 is implemented to cool the facility 102, the facility air 112 may be cooled to a comfort temperature. As the exhaust flow 112E is exhausted from the facility at the exhaust 108, heat may be transferred to the exhaust flow 112E from the downhole fluid 131 at the exhaust heat exchanger 152. That heat is accordingly removed from the geological formation 148 and/or the heat pump 120 for implementing (immediately or at a later time) to further cool the facility. In this way, the exhaust heat exchanger 152 may recover at least some of the energy expenditure associated with conditioning the facility air 112 by leveraging the thermal energy of the exhaust flow 112E, which would otherwise be lost to the thermal system 100. In this way, the thermal system 100 may operate more efficiently, with a lower operation cost (e.g., utilize less electricity at the heat pump), and may reduce carbon emissions.

In some embodiments, the downhole fluid circuit 130 includes a fluid distribution device 154. The fluid distribution device 154 may be an actuatable valve, such as a 3-way valve, and may include a fluid circulation device such as a pump. the fluid distribution device 154 may be operated to direct the flow of the downhole fluid 131, for example, with respect to the exhaust loop 150. For example, as shown in FIG. 1B, the fluid distribution device 154 directs the downhole fluid 131 to flow from the outlet 124 of the heat pump 120, through the exhaust loop 150 and the exhaust heat exchanger 152, and to the inlet 142 of the borehole heat exchanger 140. In this way, the fluid distribution device 154 may be connected to the main loop 132 in series, for example, downstream of the heat pump 120 and upstream of the borehole heat exchanger 140. As shown and described in more detail below, the exhaust loop 150 may be connected to the main loop 132 in various other configurations, including selective configurations, for flowing the downhole fluid 131 to the exhaust heat exchanger 152 in different manners. For instance, FIG. 1C illustrates a configuration in which all of the downhole fluid 131 flows through the exhaust loop downstream of the heat pump and upstream of the borehole heat exchangers has been shown.

The thermal system 100 may include one or more sensors for taking one or more measurements. For example, in some embodiments the thermal system 100 includes one or more temperature sensors for measuring fluid and/or air temperatures of one or more fluids and at one or more locations of the thermal system 100. For instance, in some cases the thermal system 100 includes a first downhole temperature sensor T1 for measuring the temperature of the downhole fluid 131 flowing into the inlet 142 of the borehole heat exchanger 140. The thermal system 100 may include a second downhole temperature sensor T2 for measuring the temperature of the downhole fluid 131 flowing out of the outlet 144 of the borehole heat exchanger 140. The thermal system 100 may include a third downhole temperature sensor T3 for measuring the temperature of the downhole fluid 131 flowing into the exhaust loop 150 and/or into the exhaust heat exchanger 152. The thermal system 100 may include a fourth temperature sensor T4 for measuring a temperature of the downhole fluid 131 flowing out of the exhaust loop 150 and/or the exhaust heat exchanger 152. The thermal system 100 may include a temperature sensor T0 for measuring a temperature of the downhole fluid 131 flowing out of the outlet 124 of the heat pump 120. The thermal system 100 may include a first air temperature sensor T5 for measuring a temperature of the exhaust flow 112E flowing into the exhaust heat exchanger 152. The thermal system 100 may include a second air temperature sensor T6 flowing out of the exhaust heat exchanger 152. The thermal system 100 may include one or more sensors for measuring temperatures at any other location of the thermal system 100, such as a temperature of the facility (e.g., including a setpoint or desired comfort temperature), ambient air temperature, supply flow temperature, return flow temperature, etc.

The fluid distribution device 154 may be operated to selectively implement the fluid distribution device 154 and/or selectively activate the exhaust loop 150. For example, in some cases, the downhole fluid 131 may flow through only the main loop 132 to facilitate exchanging heat between the geological formation 148 and the heat pump 120. The exhaust loop 150 may be activated and the exhaust heat exchanger 152 implemented to transfer heat between the downhole fluid 131 and the exhaust flow 112E to facilitate energy recovery as described herein in one or more situations in which such an operation may be advantageous. For example, the thermal system 100 may include a controller 134 for implementing a control strategy to operate the thermal system 100. For example, the controller 134 may receive one or more sensor measurements and then implement one or more various operating modes of the thermal system 100. For instance, the controller 134 may control the activation of the exhaust loop 150 via the fluid distribution device 154 or other device. The controller 134 may control any other component, fluid circuit, loop, device, etc., of the thermal system 100.

In some embodiments, the exhaust loop 150 may be activated based on a temperature difference between the temperature at T5 and the temperature at T3 or T0 being at least a threshold value, such as at least 3° C., 4° C., 5° C., 10° C. or other threshold. For example, the temperature difference threshold may ensure that sufficient heat may be transferred between the downhole fluid 131 and the exhaust flow 112E at the exhaust heat exchanger 152, for example, to facilitate recovering substantial energy to the system (e.g., considering the energy required to pump the downhole fluid 131 to the exhaust heat exchanger 152, heat transfer lost between the exhaust loop 150 and the ambient environment, etc.).

In some embodiments, the exhaust loop 150 may be activated based on one or more other temperatures and/or temperature differentials. For example, the exhaust loop 150 may be activated based on the temperature at T0, such as when the temperature at T0 is a threshold different lower (for heating) or higher (for cooling) than the temperature at T1 or at T4. For instance, if the temperature of the downhole fluid 131 is not sufficiently different between the temperature flowing out of the outlet 124 of the heat pump 120 and the temperature after passing through the exhaust heat exchanger 152 at T4 or at T1, it may not be advantageous to implement the exhaust loop 150 and/or the thermal system 100 may deactivate the exhaust loop 150. For instance, such a lack of temperature difference may be due to the exhaust flow 112E not being sufficiently warm or cool, too much heat transfer occurring throughout the exhaust loop 150 with the ambient environment etc.

In some embodiments, the exhaust loop 150 may be activated based on the temperature at T1 and/or T2 compared to the temperature at T5. For example, in a situation where the heat pump 120 is turned off, it may be advantageous to transfer heat to or from the geological formation 148 by leveraging the exhaust flow 112E. Accordingly, if the temperature of the downhole fluid 131 flowing into and/or out of the borehole heat exchanger 140 is a threshold difference from the temperature, at T5, of the exhaust flow 112E, the thermal system 100 may implement the exhaust heat exchanger 152 to transfer heat between the geological formation 148 and the exhaust flow 112E.

In some embodiments, the exhaust loop 150 may be activated in a binary, or on-off relationship, such as by actuating or de-actuating the fluid distribution device 154. In some embodiments, the exhaust loop 150 may be modulated, metered, or otherwise dynamically controlled in proportional amounts based on dynamically controlling the fluid distribution device 154. For example, a portion of the downhole fluid 131 may be directed along the exhaust loop 150 to exchange heat with the exhaust flow 112E at the exhaust heat exchanger 152, and a portion of the downhole fluid 131 may be directed along the main loop 132 to the borehole heat exchanger 140. In some embodiments, the exhaust loop 150 may be dynamically modulated in this way based on one or more temperatures and/or temperature differences as described herein. For example, dynamically modulating the exhaust loop 150 in this way may facilitate exchanging heat with the exhaust flow 112E to the extent that the operational conditions (e.g., temperature of the geological formation 148 and/or exhaust flow 112E and/or ambient temperature, etc.) allow. For instance, the downhole fluid 131 may be dynamically modulated to flow in proportional amounts to the exhaust loop 150 and to the main loop 132 corresponding with proportional amounts of heat to be exchanged to or from the downhole fluid circuit 130 via the exhaust heat exchanger 152 and the borehole heat exchanger 140, which may be determined based on the various temperatures associated with these components. The thermal system 100 may be operated to selectively direct and/or dynamically modulate the downhole fluid 131 through the exhaust loop 150 in accordance with any other control scheme and with respect to any other temperature(s) and/or temperature difference(s).

In some cases, the exhaust heat exchanger 152 may facilitate managing a temperature of the geological formation 148. For example, in situations (e.g., during winter) when the facility 102 calls for heating, the downhole fluid 131 may generally exit the heat pump 120 at a temperature that is close to zero (e.g., 2° C.) and the downhole fluid 131 may flow through the borehole heat exchanger 140 to extract calories from the geological formation 148. The downhole fluid 131 may approximately reach the temperature of the geological formation 148 when exiting the borehole heat exchanger 140, therefore lowering the temperature of the geological formation 148. By implementing the exhaust heat exchanger 152, the downhole fluid 131 may exchange heat with the exhaust flow 112E at a temperature, for example, around 20° C., which may increase the temperature of the downhole fluid 131, for instance to about 8° C. Therefore, the downhole fluid 131 may accordingly flow to and through the borehole heat exchanger 140 at a relatively warmer temperature and may extract less calories from the geological formation 148 (or in some cases even no calories) as compared to when the exhaust heat exchanger 152 is not implemented. In other words, because some heating of the downhole fluid 131 is achieved based on extracting heat from the exhaust flow 112E, less heat may be extracted from the ground to heat the downhole fluid 131. In some cases, the temperature of the geological formation 148 may even increase, and heat extracted for the exhaust flow 112E may accordingly be stored in the geological formation 148 for later use. Further, the exhaust heat exchanger 152 may be implemented to extract heat from the exhaust heat exchanger 152 (e.g., or from an ambient air) to transfer to the geological formation 148 when the heat pump 120 is turned off or not in use, such as when the facility 102 is not calling for any heating. Accordingly, the thermal system 100 operating in this way may facilitate managing a temperature of the geological formation 148, for example, to comply with one or more regulations governing ground temperatures for geothermal use. A similar effect can be achieved when the thermal system 100 is used for cooling the facility 102 (e.g., during summer) to advantageously prevent excessive heating of the geological formation 148 as heat is being rejected to the geological formation 148 to provide cooling.

Figure 1D:
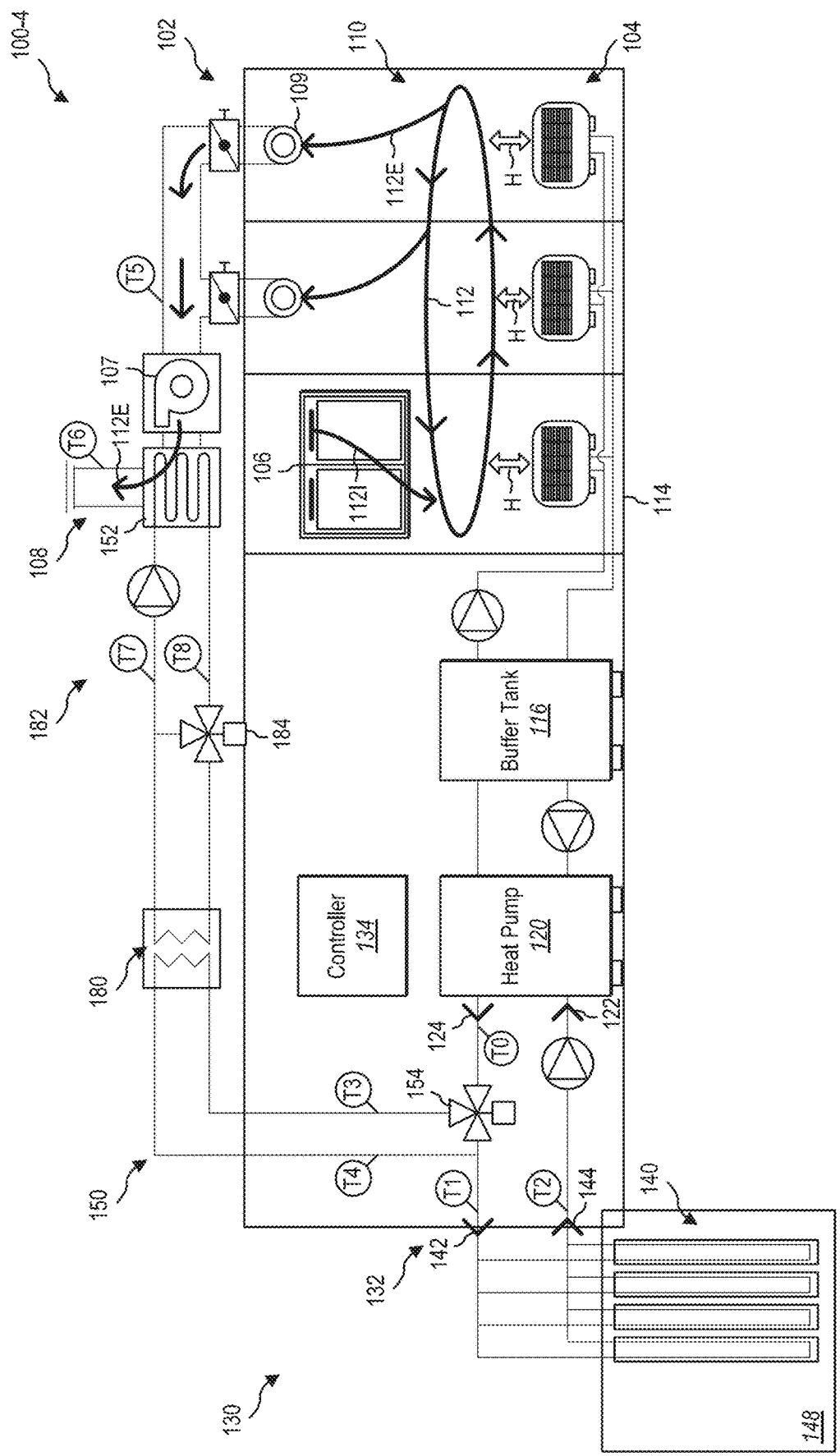

As shown in FIG. 1D, in some embodiments the thermal system 100 includes a loop heat exchanger 180. The loop heat exchanger 180 may be positioned on the exhaust loop 150, and may separate or isolate the exhaust loop from the exhaust heat exchanger 152. For example, the exhaust loop and the downhole fluid flowing therein may not directly interact and/or exchange heat at the exhaust heat exchanger 152, but instead may interface with the loop heat exchanger 180. For instance, an intermediate loop 182 may be positioned between the exhaust heat exchanger 152 and the loop heat exchanger 180 for flowing an loop working fluid therein. In this way, the loop working fluid may exchange heat with the exhaust flow 112E at the exhaust heat exchanger 152 and the loop working fluid may exchange heat with the downhole fluid at the loop heat exchanger 180. The intermediate loop 182 may include one or more fluid distributing devices 184, such as one or more valves and/or pumps for flowing and/or directing the circulation of the loop working fluid in the intermediate loop 182. The intermediate loop 182 may include one or more sensors for measuring temperature at one or more locations of the intermediate loop 182, such as a temperature T7 and a temperature T8. The control of the intermediate loop 182, exhaust loop 150, or other functionality of the thermal system 100 may be based on the temperature T7 and/or T8.

The loop heat exchanger 180 and the intermediate loop 182 may facilitate implementing the exhaust heat exchanger 152. For example, implementing the intermediate loop 182 and positioning the loop heat exchanger 180 on the exhaust loop 150 may have the effect of the downhole fluid not having to flow entirely to the exhaust heat exchanger 152, which may reduce the amount of downhole fluid utilized, reduce the total travel length of the downhole fluid, etc. This may help to reduce the potential for leaks or fluid loss in the downhole fluid circuit 130. This may also facilitate implementing different fluids for the downhole fluid and the intermediate working fluid, for example, to select fluids that are better equipped to encounter the environmental and/or operational conditions of the downhole fluid circuit 130 and the intermediate loop 182, as well as using different fluid parameters (such as temperatures, pressures and/or flow rates FIGS. 1E through 1H illustrate example schematic diagrams of a thermal system 100-5, according to one or more embodiments of the present disclosure. The thermal system 100-5 may be substantially similar to, and may include any of the components, features, and/or functionalities of the thermal system 100 of FIGS. 1A and 1D.

The thermal system 100-5 includes a bypass line 156 incorporated on the exhaust loop 150. The bypass line 156 may be a selectively configurable line which may operate to connect a return line of the exhaust loop 150 to the main loop 132 at or downstream of the outlet 144 of the borehole heat exchanger 140. For example, the thermal system 100-5 may include a bypass fluid distribution device 158 for selectively activating the exhaust loop 150 between a serial configuration as shown and described in connection with the thermal system 100 (e.g., in FIG. 1F), and a parallel configuration (e.g., in FIG. 1E). For example, when the bypass line 156 is implemented, the exhaust heat exchanger 152 may be connected in parallel with the borehole heat exchanger 140 and/or the heat pump 120. The bypass line 156 may be implemented by the controller 134 controlling an actuation of the bypass fluid distribution device 158.

The bypass line 156 may facilitate selectively directing the flow of the downhole fluid 131 after it has exchanged heat with the exhaust flow 112E at the exhaust heat exchanger 152. For example, the bypass line 156 may be implemented (e.g., based on the bypass fluid distribution device 158) to direct the flow of the downhole fluid 131 in the serial configuration (e.g., in accordance with FIG. 1B) such that the downhole fluid 131 flows from the outlet 124 of the heat pump 120, through the exhaust loop 150 and exhaust heat exchanger 152, and to the inlet 142 of the borehole heat exchanger 140. Alternatively, the bypass line 156 may be activated (e.g., by actuating the bypass fluid distribution device 158 and in accordance with the fluid distribution device 154) to direct the flow of the downhole fluid 131 from the exhaust heat exchanger 152 selectively to either the heat pump 120 or the borehole heat exchanger 140. This may facilitate operating the thermal system 100-5 in accordance with one or more control strategies, for example, to leverage the operational conditions (e.g., temperatures at one or more locations) for various purposes.

Figure 1E:
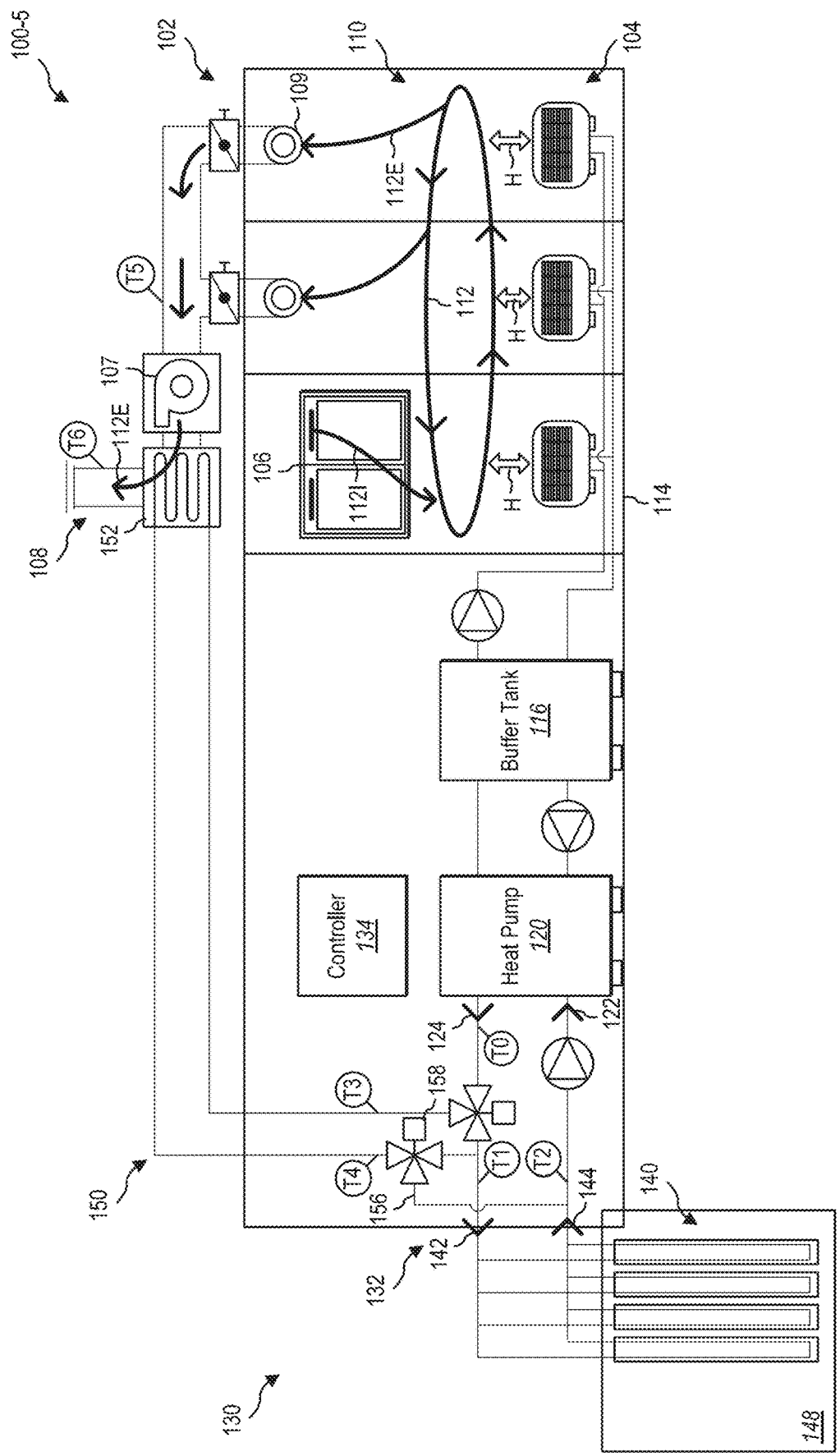
FIGS. 1E through 1H illustrate example schematic diagrams of a thermal system, according to one or more embodiments of the present disclosure.

With reference now to FIG. 1E, in some situations, for example, if the temperature at T2 is substantially the same as the temperature at TO (e.g., or otherwise not at or exceeding a minimum or threshold difference), it may be advantageous to direct the downhole fluid 131 from the exhaust heat exchanger 152 to bypass the borehole heat exchanger 140 and flow (e.g., directly) to the heat pump 120. For instance, if the temperature at T4 is higher than the temperature at T2 (e.g., for heating) or lower than the temperature at T2 (e.g., for cooling), the efficiency of the thermal system 100-5 may be increased based on utilizing the downhole fluid 131 directly from the exhaust heat exchanger 152 without implementing the borehole heat exchanger 140. For instance, this may help to maximize or increase the effect of the energy recovery at the exhaust heat exchanger 152. Additionally, this may also help to reduce the energy required (e.g., via one or more pumps) to pump the downhole fluid 131, as well as reduce any undesirable heat transfer to the environment associated with unnecessarily flowing the downhole fluid 131 through lines where it is not needed. Accordingly, the bypass fluid distribution device 158 may activate the bypass line 156, and in conjunction with the fluid distribution device 154, the thermal system 100-5 may operate to transfer heat between the heat pump 120 and the exhaust flow 112E via the exhaust heat exchanger 152 without implementing the borehole heat exchanger 140.

Figure 1F:
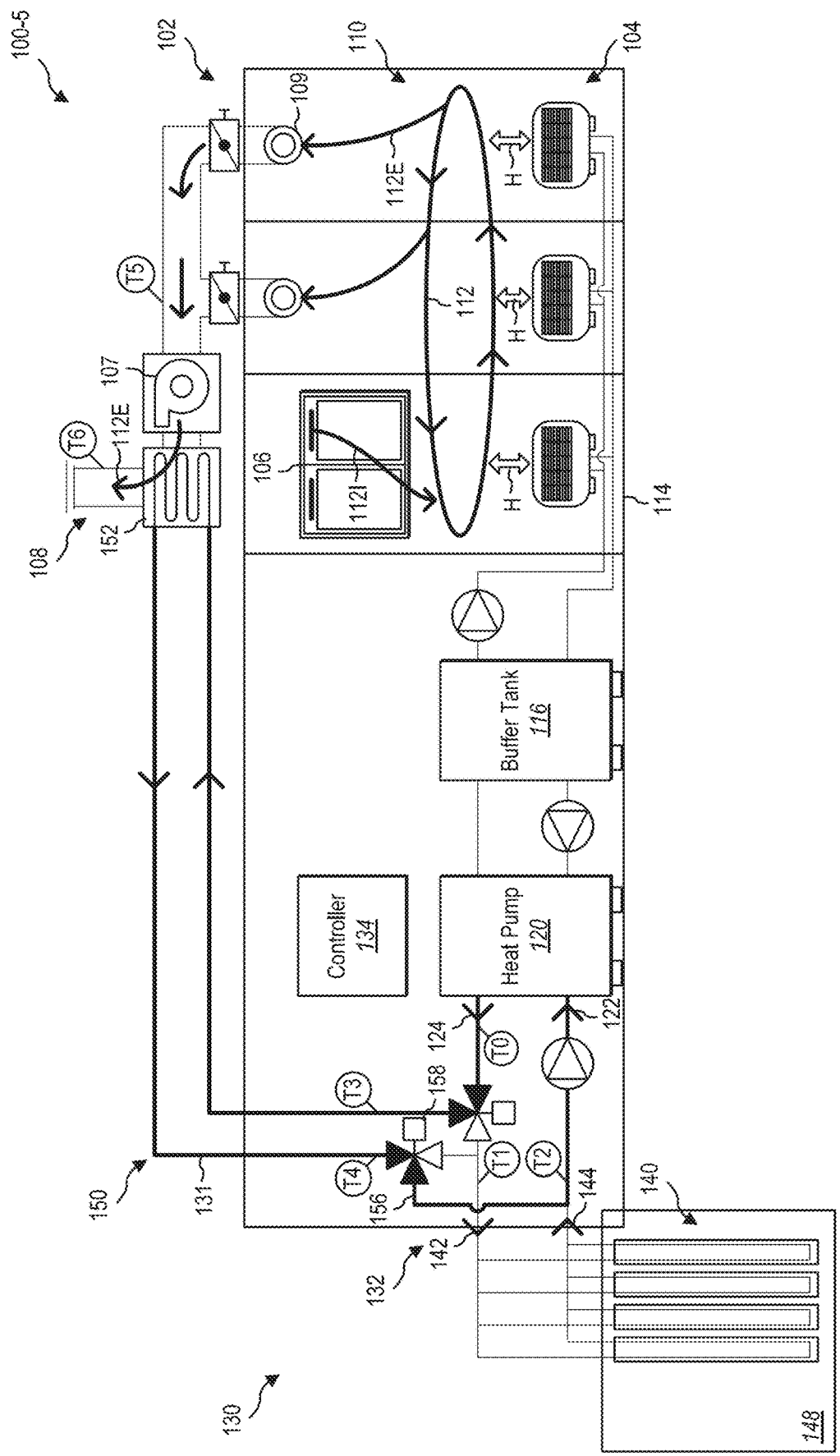
Figure 1G:
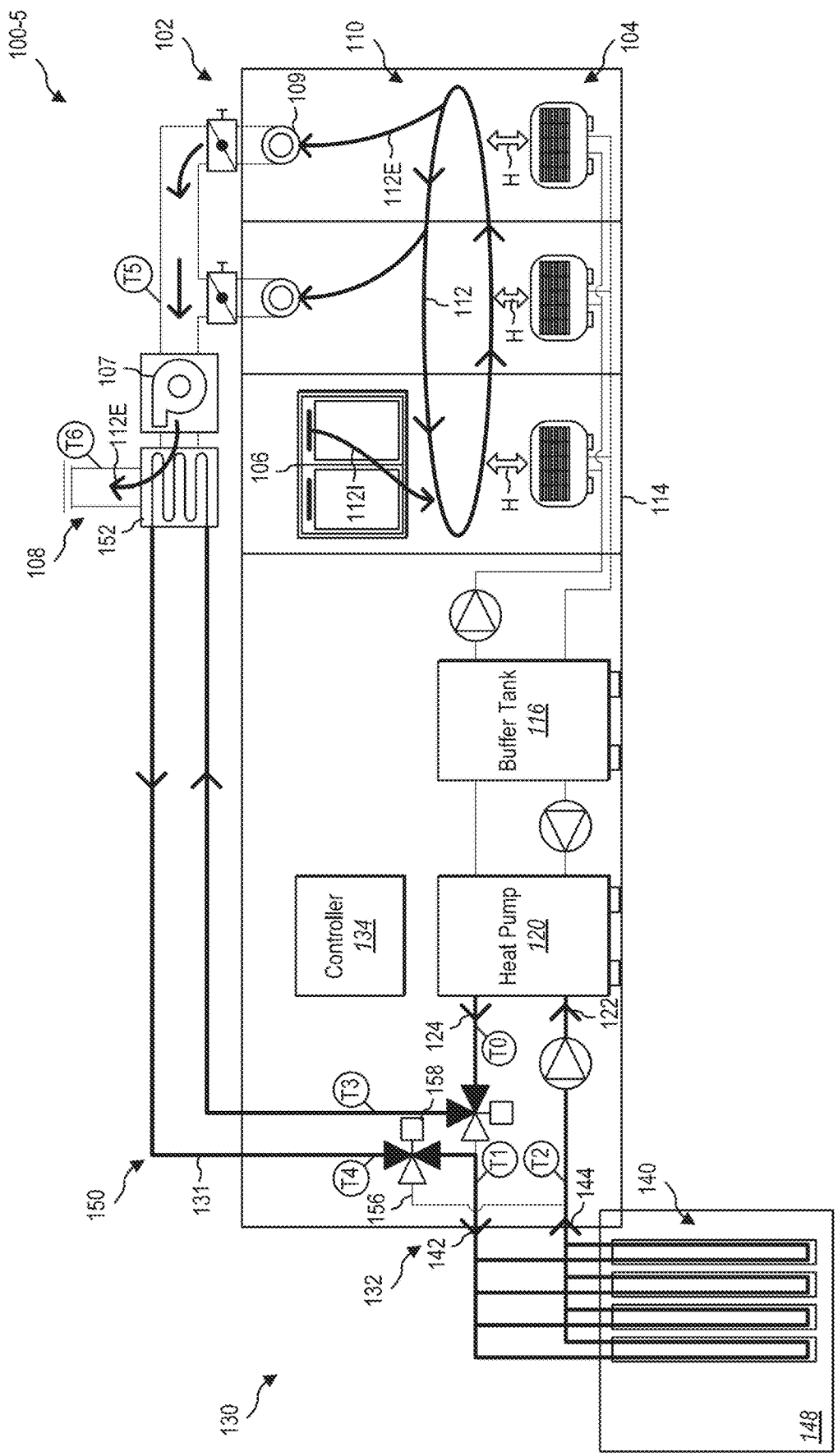

With reference now to FIG. 1F, in some situations it may be advantageous to exchange heat between the downhole fluid 131 from the exhaust heat exchanger 152 and geological formation 148 via the borehole heat exchanger 140. For instance, in some situations the heat pump 120 may be turned off, such as when the facility 102 is not calling for heating or cooling, when the facility fluid circuit 114 is operating based on the buffer tank 116, etc. In such situations, however, it may nevertheless be desirable to continue exchanging heat between the geological formation 148 and the exhaust heat exchanger 152, such as to inject heat into the geological formation 148 or extract heat from the geological formation 148 to facilitate managing the temperature of the geological formation 148 to comply with a regulatory temperature range. Accordingly, in some cases, the thermal system 100-5 may operate to flow the downhole fluid 131 as shown in FIG. 1F through the exhaust heat exchanger 152, the borehole heat exchanger 140, and the heat pump 120. Notably, the heat pump 120 may be turned off such that heat is not transferred to or from the downhole fluid 131 at the heat pump 120, but rather heat transfer may be limited to occurring between the geological formation 148 at the borehole heat exchanger 140 and the exhaust flow 112E at the exhaust heat exchanger 152.

For example, in situations where the temperature at T2 of the geological formation 148 is relatively low with respect to an annual average temperature of the geological formation 148 and/or with respect to a regulatory temperature range for the geological formation 148, and the facility comfort temperature (and accordingly the temperature at T5 of the exhaust flow 112E) is warmer than the temperature at T2, it may be advantageous to transfer heat from the exhaust flow 112E to the geological formation 148 to raise the temperature of the geological formation 148 (e.g., at T2) and/or to store thermal energy in the geological formation 148 for later use. In another example, in situations where the temperature at T2 of the geological formation 148 is relatively high with respect to an annual average temperature of the geological formation 148 and/or with respect to a regulatory temperature range for the geological formation 148, and the facility comfort temperature (and accordingly the temperature at T5 of the exhaust flow 112E) is colder than the temperature at T2, it may be advantageous to transfer heat from the geological formation 148 to the exhaust flow 112E to lower the temperature of the geological formation 148 (e.g., at T2) and/or to deplete thermal energy from the geological formation 148 for later use. Accordingly, the thermal system 100-5 may be operated to flow the downhole fluid 131 as shown in FIG. 1F with the heat pump 120 turned off such that heat exchange occurs between the exhaust flow 112E and the geological formation 148.

Figure 1H:
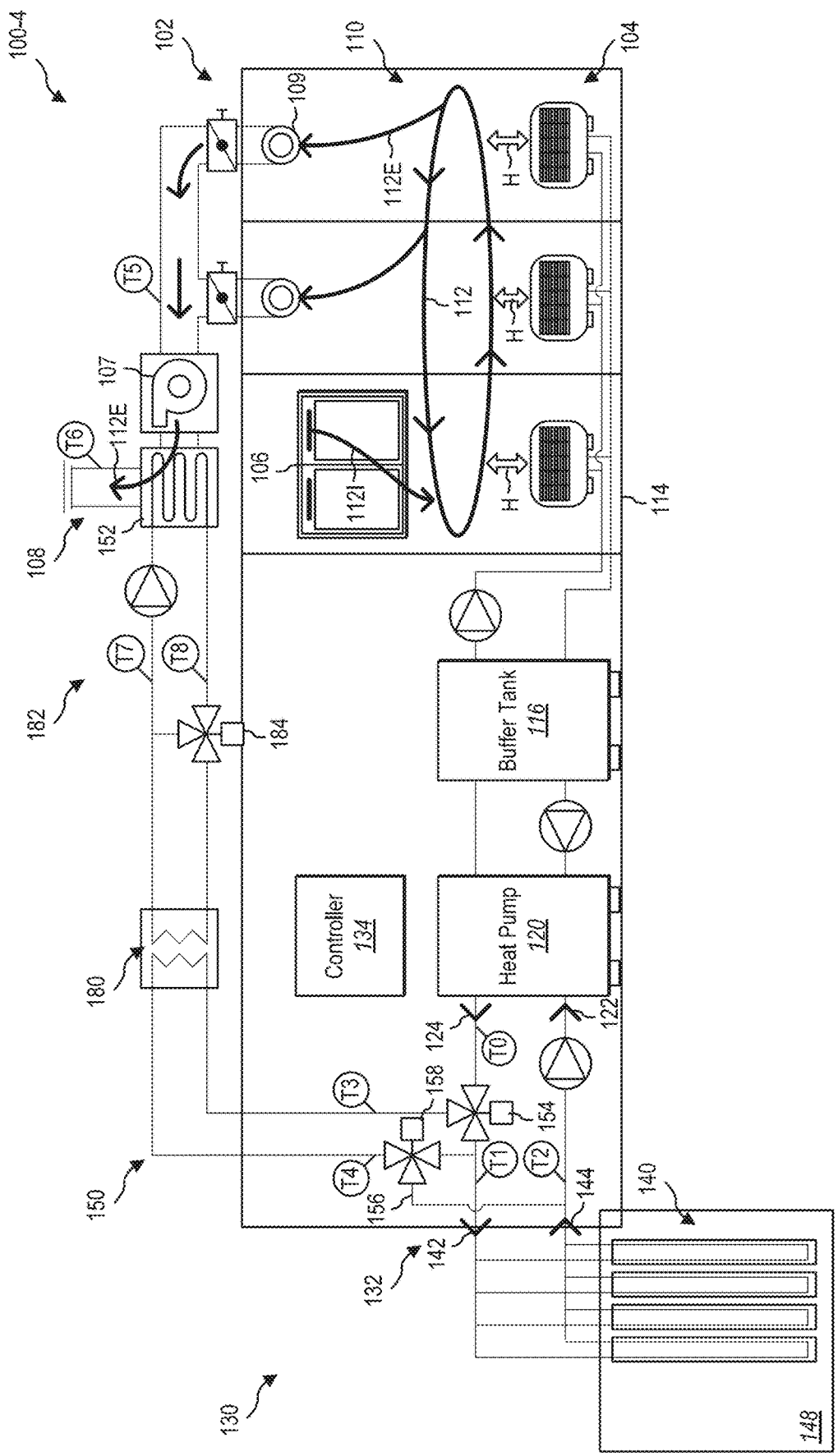

As shown in FIG. 1H, in some embodiments, the thermal system 100-5 includes the loop heat exchanger 180 positioned on the exhaust loop 150 for facilitating heat transfer between the exhaust flow 112E and the downhole fluid via a loop working fluid circulating through an intermediate loop 182.

Figure 2A:
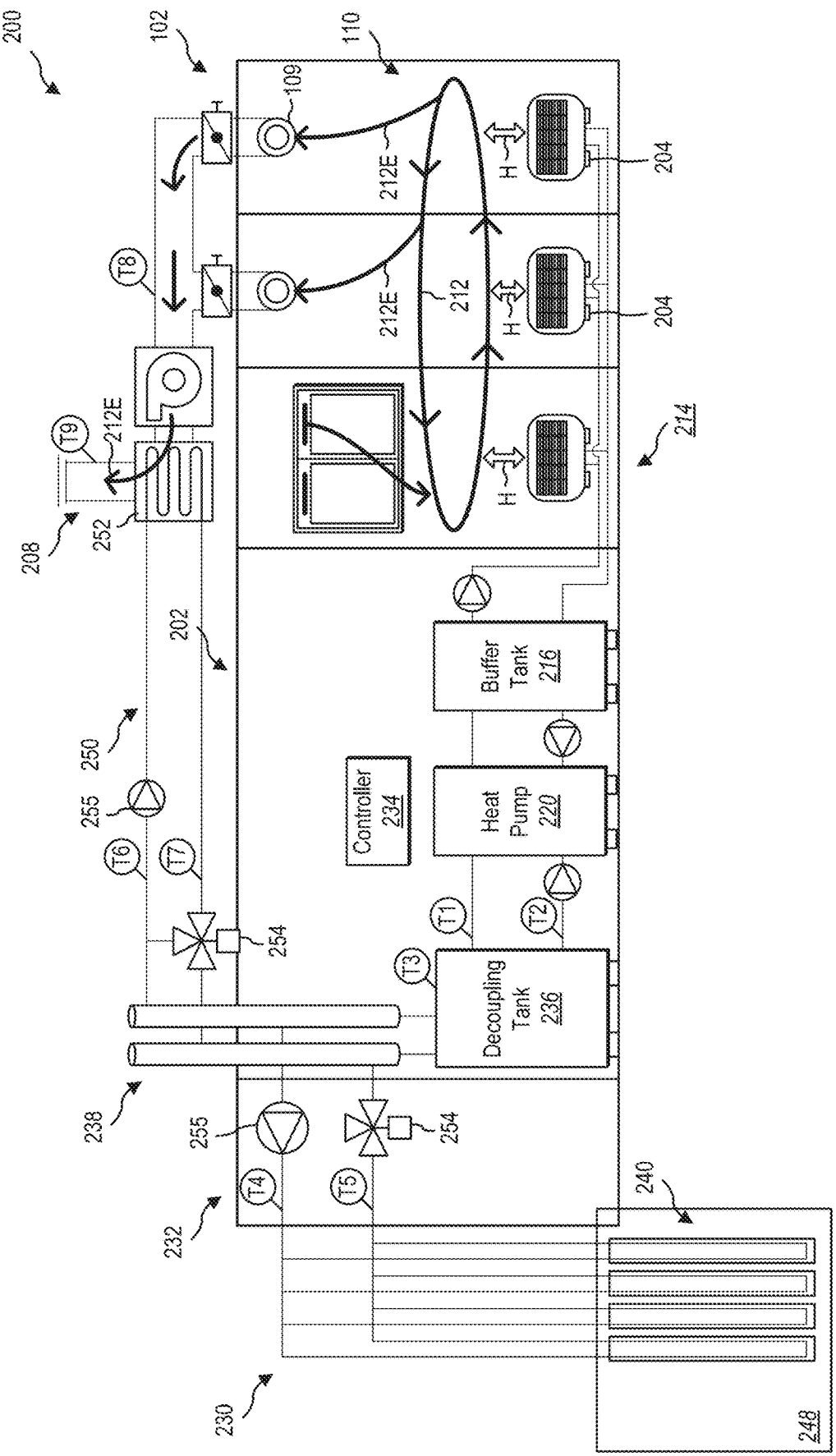
FIGS. 2A to 2C illustrate example schematic diagrams of a thermal system, according to one or more embodiments of the present disclosure.
Figure 2B:
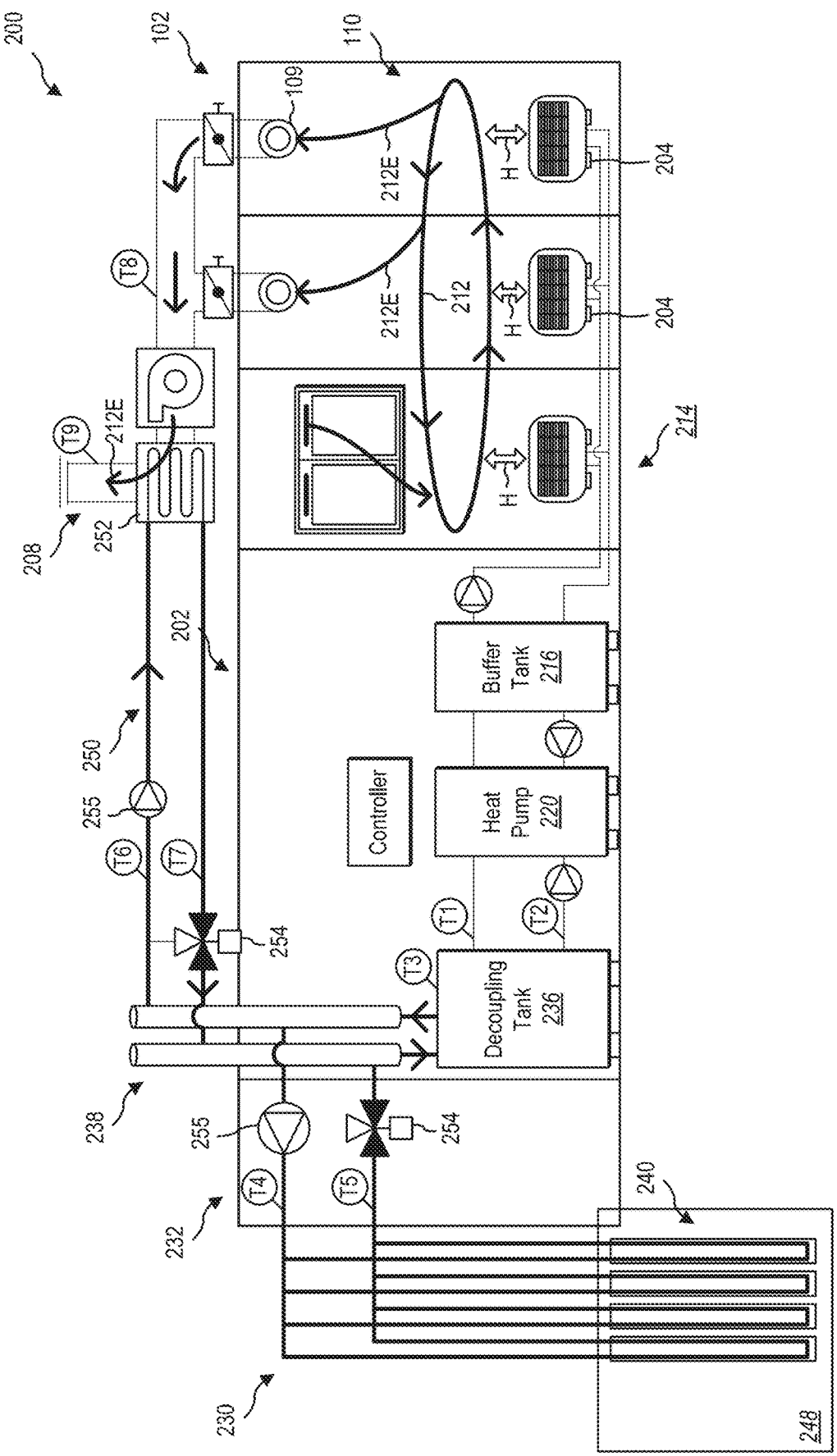

FIGS. 2A and 2B illustrate example schematic diagrams of a thermal system 200, according to one or more embodiments of the present disclosure. The thermal system 200 may be substantially similar to, and may include any of the components, features, and/or functionalities of the thermal system 100 of FIGS. 1A through 1C and/or the thermal system 100-5 of FIGS. 1D through 1F.

For example, the thermal system 200 includes a downhole fluid circuit 230 including a borehole heat exchanger 240. A downhole fluid 131 circulates through the downhole fluid circuit 230 for exchanging heat between a geological formation 248 and a heat pump 220. A facility fluid 212 may be in thermal communication with the heat pump 220 via a facility fluid circuit 214 and/or a buffer tank 216 for conditioning the facility fluid 212 at one or more facility heat exchangers 204 and thereby thermally conditioning a facility 202. An exhaust flow 212E of the facility fluid 212 may flow through an exhaust 208 of the facility.

The downhole fluid circuit 230 includes a main loop 232 and an exhaust loop 250. The main loop includes the borehole heat exchanger 240 for circulating the downhole fluid 131 through the geological formation 248. The exhaust loop 250 includes an exhaust heat exchanger 252 for exchanging heat between the downhole fluid 131 and the exhaust flow 212E as described herein.

The downhole fluid circuit 230 includes a decoupling tank 236. For example, the decoupling tank may be a tank for storing a volume of the downhole fluid 131 as a thermal energy storage. Each of the exhaust loop 250 and the main loop 232 may interface with the decoupling tank 236 to store (or discharge) thermal energy at the decoupling tank 236. The exhaust loop 250 and the main loop 232 are each connected to the decoupling tank 236 via decoupling manifolds 238. For instance, exhaust loop 250 and the main loop 232 may be connected in parallel via the decoupling manifolds 238 to the decoupling tank 236.

The decoupling manifolds 238 and the decoupling tank 236 may facilitate connecting the main loop 232 and the exhaust loop 250 to the decoupling tank 236 in such a way that each of the main loop 232 and the exhaust loop 250 may be implemented with an independent or different flowrate and/or pressure. For example, as shown in FIG. 2B, the downhole fluid 131 may flow through the exhaust loop 250 and through the decoupling manifolds 238 as shown and may do so at a first flowrate and/or pressure. The downhole fluid 131 may flow through the main loop 232 and through the decoupling manifolds 238 as shown, and may do so at a second, different flowrate and/or pressure. The exhaust loop 250 and the main loop 232 may each include one or more pumps 255 and fluid distribution devices 254 for operating each loop at an associated flowrate and/or pressure. The fluid distribution devices 254 may facilitate activating, deactivation, and/or metering the flow of the downhole fluid through the respective loops. For example, in some cases the temperature of the downhole fluid within the decoupling tank 236, borehole heat exchanger 250, decoupling manifolds 238, etc., may be below freezing (e.g., below 0° C.), and the fluid distribution devices 254 may be actuated or configured such that the downhole fluid does not flow to the exhaust heat exchanger, for example, to prevent the exhaust heat exchanger from freezing, developing frost, etc.

The flowrate and/or pressure of each of the main loop 232 and the exhaust loop 250 may be determined and/or managed based on a control strategy, based on the needs of the facility 202, and/or based on the operating conditions of the geological formation 248 and/or the exhaust heat exchanger 252. The thermal system 200 includes various sensors T1-T9 for taking temperature measurements at one or more locations. The thermal system 200 may be operated based on any of these temperature measurements, among other data. For example, the exhaust loop 250 may be operated at a given flowrate so as to maximize the amount of heat transferred to and/or from the exhaust flow 212E based on the temperature of the downhole fluid 131 (e.g., at T6) and/or the temperature of the exhaust flow 212E (e.g., at T8). The flowrate required to achieve this may be a different flowrate than is needed to efficiently operate the main loop 232, for example given the temperatures of the downhole fluid 131 at T4 and T5.

In some cases, the decoupling tank 236 may facilitate bypassing the heat pump 220. For example, heat may be exchanged between the geological formation 248 at the borehole heat exchangers 240 and the exhaust flow 212E at the exhaust heat exchanger 252 via the decoupling tanks 236, for example, without exchanging heat with the heat pump 220.

In this way, the thermal system 200 may be operated based on separate flowrates and/or pressures of the main loop 232 and exhaust loop 250 in order to increase efficiency. Each loop of the downhole fluid circuit 230 may be operated with its own flowrate in order to achieve one or more objectives for that loop, and each loop may exchange heat with the decoupling tank 236 such that the downhole fluid circuit 230 may provide heating and/or cooling to the heat pump 220 via the decoupling tank 236.

Figure 2C:
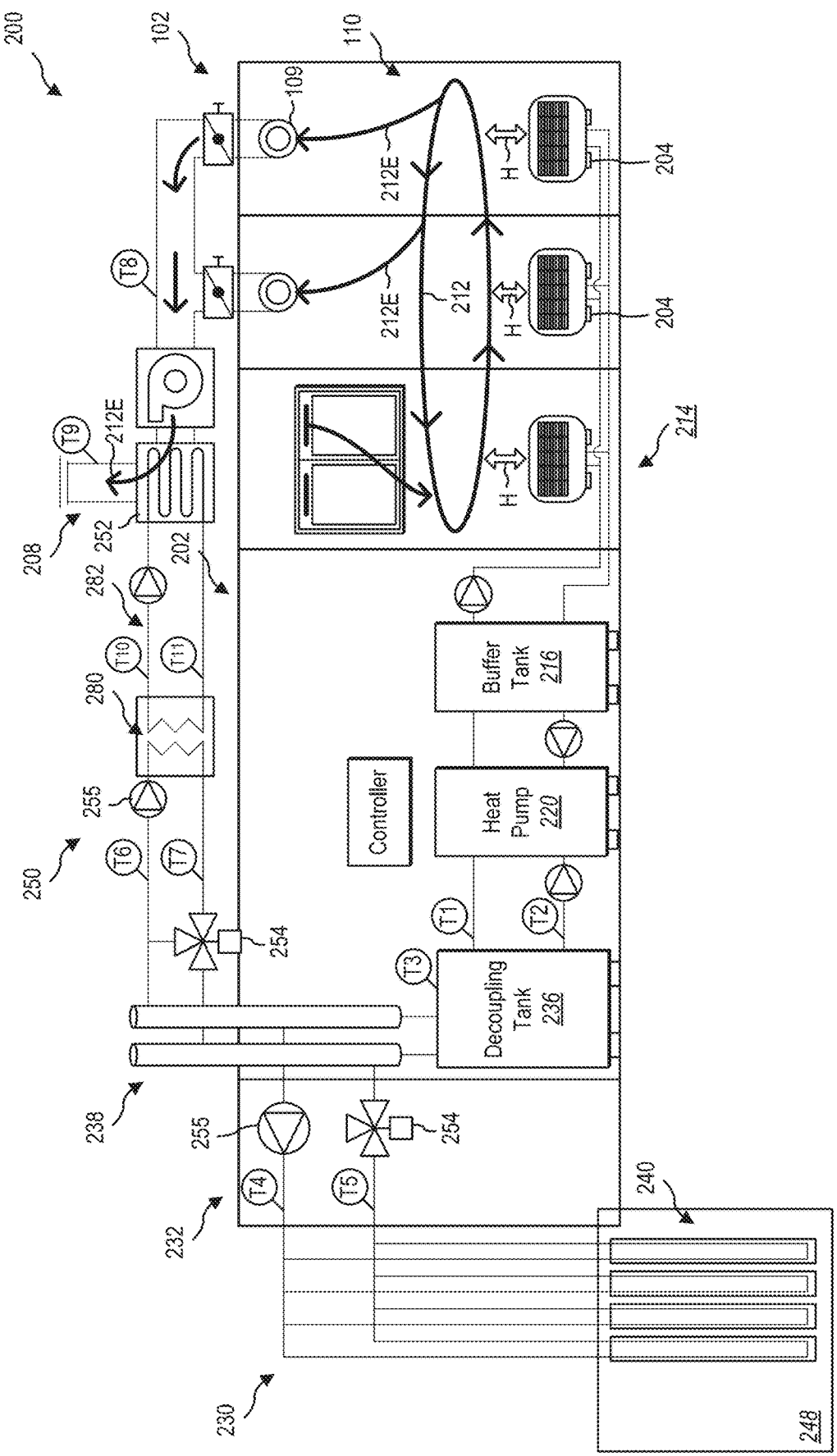

As shown in FIG. 2C, in some embodiments the thermal system 200 includes a loop heat exchanger 280. The loop heat exchanger may substantially similar to the loop heat exchanger 180 as described in connection with FIGS. 1D and 1H. For instance, an intermediate loop 282 may be positioned between the loop heat exchanger 280 and the exhaust heat exchanger 252 for circulating a loop working fluid. In this way, heat may be exchanged indirectly between the exhaust flow 212E and the downhole fluid via the loop heat exchanger 280 and the intermediate loop 282. In some cases, one or more sensors may be positioned on the intermediate loop for measuring a temperature T10 and T11.

Figure 3:
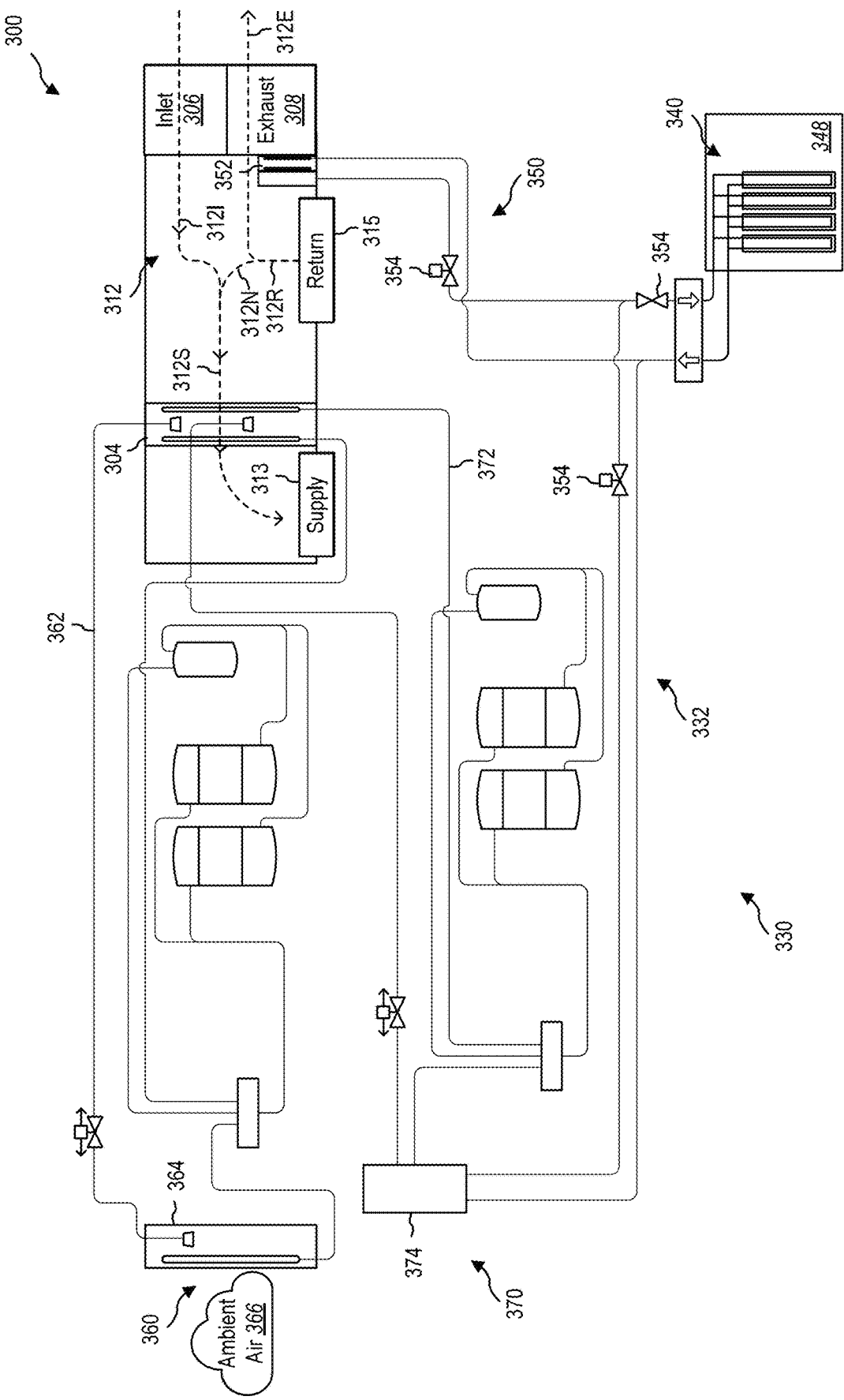
FIG. 3 illustrates an example schematic diagram of a thermal system, according to at least one embodiment of the present disclosure.

FIG. 3 illustrates a schematic diagram of a thermal system 300, according to at least one embodiment of the present disclosure. The thermal system 300 is an example implementation of the energy recovery techniques described herein with respect to implementing and operating an exhaust heat exchanger.

The thermal system 300 may be implemented at or with respect to a facility. For example, the thermal system 300 may operate to condition and circulate a facility fluid 312, in this case air, throughout a facility. In some embodiments, the thermal system 300 includes an air supply 313 for providing a supply flow 312S of the facility fluid 312 to the facility. The thermal system 300 includes an air return 315 for receiving a return flow 312R of the facility fluid from the facility. In some cases, the thermal system 300 includes an air inlet 306 for receiving an inlet flow 312I of the facility fluid 312, such as outside air or fresh air. In some embodiments, the thermal system 300 includes an exhaust 308 for exhausting an exhaust flow 312E of the facility fluid 312 out of the facility. For example, the thermal system 300 may include one or more dampers or louvers for splitting and/or directing a portion of the return flow 312R as the exhaust flow 312E to the exhaust 308. A portion of the return flow 312R may be split and/or directed as a renewed flow 312N of the facility fluid toward the air supply 313. Accordingly, the supply flow 312S may comprise the inlet flow 312I and the renewed flow 312N. In this way, the thermal system 300 may facilitate circulating the facility fluid throughout the facility, including providing fresh, outside air based on the inlet flow 312I and the exhaust flow 312E. One or more dampers, ducts, circulation device, or other components may be implemented for directing the airflow as described and/or for producing the various flows of the facility fluid 312.

The thermal system 300 includes a facility heat exchanger 304. The facility heat exchanger 304 may exchange heat with the supply flow 312S to provide thermal conditioning to the facility as described herein. The facility heat exchanger 304 may be connected to a ground-source heat pump 370. For example, the facility heat exchanger 304 may be included as part of the ground-source heat pump 370, such as on a ground-source heat pump fluid circuit 372 of the ground-source heat pump 370. The ground-source heat pump 370 may include one or more compressors, one or more expansion valves, and additional components for operating a refrigerant cycle between the facility heat exchanger 304 and a ground-source heat exchanger 374. In this way, the ground-source heat pump 370 may operate to exchange heat between a downhole fluid of a downhole fluid circuit 330 and the facility fluid 312. The ground-source heat pump 370 may operate in much the same way as the heat pump(s) and downhole fluid circuit(s) described herein in relation to other illustrative figures. However, in the thermal system 300, the facility heat exchanger 304 may be included as a part of the ground-source heat pump 370 for a more direct thermal connection to the downhole fluid circuit 330, for example, in contrast to the facility heat exchanger 304 being connected to a heat pump via an intermediate facility fluid circuit as described in one or more other embodiments.

In some cases, the facility heat exchanger 304 may be connected additionally to one or more other heat pumps. For example, as shown in FIG. 3, the facility heat exchanger 304 may be connected to an air-source heat pump 360. For example, the facility heat exchanger 304 may be included as part of the air-source heat pump 360, such as on an air-source heat pump fluid circuit 362 of the air-source heat pump 360. The air-source heat pump 360 may similarly include one or more compressors, expansion valves, and additional components for operating a refrigerant cycle between the facility heat exchanger 304 and an air-source heat exchanger 364. In this way, the air-source heat pump 360 may operate to exchange heat between an ambient air 366 and the facility fluid 312. In some cases, both the ground-source heat pump 370 and the air-source heat pump 360 may be connected to the facility heat exchanger 304, for example in parallel, such that the facility heat exchanger 304 is common to both heat exchangers. In other examples, each of the air-source heat pump 360 and the ground-source heat pump 370 may be connected to separate facility heat exchangers 304. In some embodiments, the thermal system 300 may include one or more other or additional heat pumps to that shown and described.

As mentioned, the ground-source heat pump 370 may be connected to a downhole fluid circuit 330. The downhole fluid circuit 330 may have a main loop 332 in which a downhole fluid may flow between the ground-source heat exchanger 374 and a borehole heat exchanger 340 situated in a geological formation 348. The downhole fluid circuit 330 also includes an exhaust loop 350 including an exhaust heat exchanger 352. As described herein, the exhaust heat exchanger 352 may operate to exchange heat between the exhaust flow 312E and the downhole fluid. A fluid distribution device 354 may facilitate activating the exhaust loop 350. The exhaust loop 350 may be connected to the main loop 332 in series as shown, and as described in one or more other embodiments. For example, the downhole fluid flowing out of the ground-source heat exchanger 374 may flow through the exhaust loop 350 and to the exhaust heat exchanger 352 where it may exchange heat with the exhaust flow 312E before proceeding to flow to the borehole heat exchanger 340. In this way, at least some energy may be recovered from the exhaust flow 312E as described herein, for example, to provide back to the facility via the ground-source heat pump 370, for managing the temperature of the geological formation 348, etc.

In some embodiments, the exhaust loop 350 may also include a bypass line and associated bypass fluid distribution device, for example, for connecting the exhaust loop 350 more directly to the ground-source heat exchanger 374 and to bypass the borehole heat exchanger 340 as described herein. For example, the downhole fluid flowing out of the ground-source heat exchanger 352, after having exchanged heat with the exhaust flow 312E may flow through the bypass line and may flow back to the ground-source heat exchanger 374 without flowing through the borehole heat exchanger 340. This may facilitate operating the exhaust flow 312E and the geological formation 348 in a more independent manner, for example, to leverage the operating conditions of each of these thermal sources.

In this way, the energy recovery techniques described herein based on implementing an exhaust heat exchanger connected to a downhole circuit may be implemented in a variety of different situations and with a variety of different facilities. For example, the example thermal systems described herein in connection with the illustrative figures illustrate that an exhaust heat exchanger may be adapted for implementing in connection with a variety of different thermal systems and a variety of different facilities.

Figure 4:
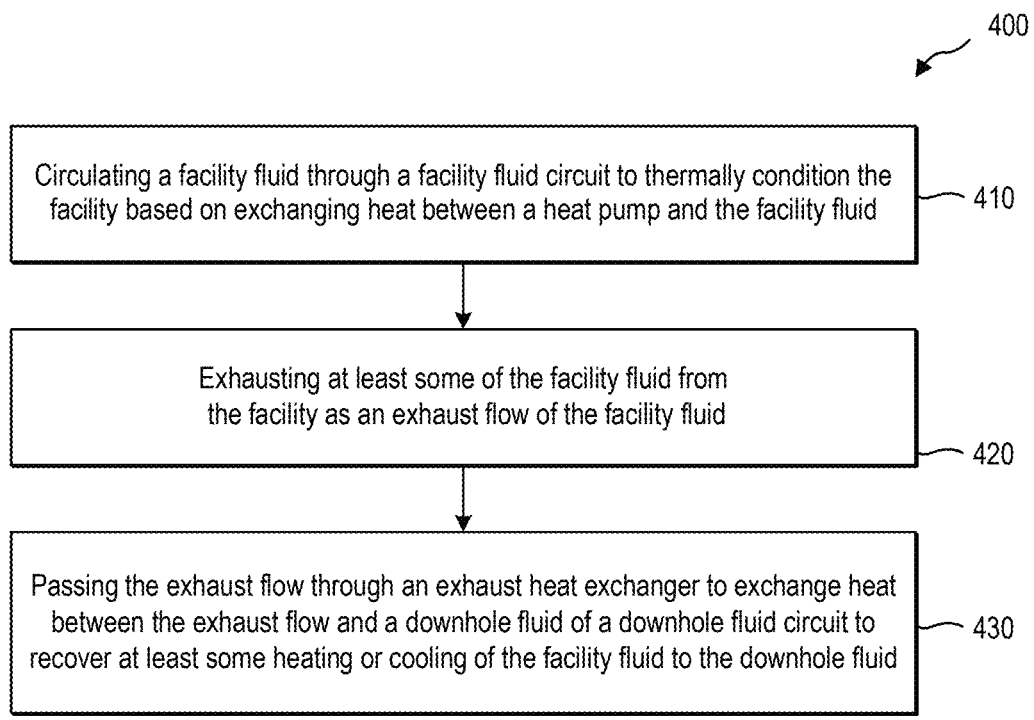
FIG. 4 illustrates a flow diagram for a method or a series of acts for operating a thermal system as described herein, according to at least one embodiment of the present disclosure.

FIG. 4 illustrates a flow diagram for a method 400 or a series of acts for operating a thermal system as described herein, according to at least one embodiment of the present disclosure. While FIG. 4 illustrates acts according to one embodiment, alternative embodiments may add to, omit, reorder, or modify any of the acts of FIG. 4.

In some embodiments, the method 400 includes an act 410 of circulating a facility fluid through a facility fluid circuit to thermally condition a facility based on exchanging heat between a heat pump and the facility fluid.

In some embodiments, the method 400 includes an act 420 of exhausting at least some of the facility fluid from the facility as an exhaust flow of the facility fluid.

In some embodiments, the method 400 includes an act 430 of passing the exhaust flow through an exhaust heat exchanger to exchange heat between the exhaust flow and a downhole fluid of a downhole fluid circuit to recover at least some heating or cooling of the facility fluid to the downhole fluid.

In some embodiments, the method 400 further includes circulating the downhole fluid through the downhole fluid circuit to exchange heat between the downhole fluid and the heat pump.

In some embodiments, the method 400 further includes circulating the downhole fluid through a borehole heat exchanger (BHE) positioned in a geological formation to exchange heat between the heat pump and the geological formation.

In some embodiments, the method 400 further includes circulating the downhole fluid between the exhaust heat exchanger and the heat pump to exchange heat between the exhaust flow and the heat pump.

In some embodiments, the method 400 further includes circulating the downhole fluid without circulating the downhole fluid in the BHE.

In some embodiments, the method 400 further includes circulating the downhole fluid between the exhaust heat exchanger and the BHE to exchange heat between the exhaust flow and the geological formation.

In some embodiments, the method 400 further includes circulating the downhole fluid without exchanging heat at the heat pump.

In some embodiments, the method 400 further includes circulating the downhole fluid between the exhaust heat exchanger and a decoupling tank of the downhole fluid circuit at a first flowrate to exchange a first heat between the exhaust flow and an energy storage of the decoupling tank, circulating the downhole fluid between the BHE and the decoupling tank at a second flow rate to exchange a second heat between the geological formation and the energy storage of the decoupling tank, and circulating the downhole fluid between the decoupling tank and the heat pump to exchange a third heat between the energy storage of the decoupling tank and the heat pump.

INDUSTRIAL APPLICABILITY

The following description from section A1-D21 includes various embodiments that, where feasible, may be combined in any permutation. For example, the embodiment of section A1 may be combined with any or all embodiments of the following paragraphs. Embodiments that describe acts of a method may be combined with embodiments that describe, for example, systems and/or devices. Any permutation of the following paragraphs is considered to be hereby disclosed for the purposes of providing "unambiguously derivable support" for any claim amendment based on the following paragraphs. Furthermore, the following paragraphs provide support such that any combination of the following paragraphs would not create an "intermediate generalization."

A1. A thermal system for providing thermal conditioning to a facility, including:
a facility air circuit for circulating a facility air throughout the facility, the facility air circuit being thermally connected to a heat pump for exchanging heat with the facility air; and
a downhole fluid circuit for circulating a downhole fluid, comprising:
the heat pump for exchanging heat with the downhole fluid;
a main loop, including a borehole heat exchanger (BHE) for exchanging heat between the downhole fluid and a geological formation; and
an exhaust loop including an exhaust heat exchanger coupled to an exhaust of the facility air circuit to exchange heat between the downhole fluid and an exhaust flow of the facility air exhausted from the facility at the exhaust.

A2. The thermal A1, further comprising a fluid distribution device included in the downhole fluid circuit for distributing the downhole fluid between the main loop and the exhaust loop, wherein the fluid distribution device includes one or more of an actuatable valve or a pump.

A3. The thermal system of A2, wherein the fluid distribution device is configured to dynamically modulate the circulation of the downhole fluid such that a portion of the downhole fluid flows to the exhaust loop and a portion of the downhole fluid flows through the main loop.

A4. The thermal system of any of A1-A3, wherein the exhaust heat exchanger is connected to the main loop via the exhaust loop in series between an outlet of the heat pump and an inlet of the BHE.

A5. The thermal system of A4, wherein the exhaust loop is connected to the main loop such that the downhole fluid flows from the outlet of the heat pump, through the exhaust heat exchanger via the exhaust loop, and to the inlet of the BHE.

A6. The thermal system of any of A1-A5, further comprising:
one or more downhole temperature sensors for measuring one or more downhole fluid temperatures at one or more of an inlet of the BHE, an outlet of the BHE, an inlet of the heat pump, an outlet of the heat pump, an inlet of the exhaust loop, or an outlet of the exhaust loop;
one or more air temperature sensors for measuring one or more air temperatures of one or more of an inlet of the exhaust heat exchanger, or an outlet of the exhaust heat exchanger; and
a controller for controlling the fluid distribution device to distribute the downhole fluid between the exhaust heat exchanger and the BHE based on the one or more downhole fluid temperatures, the one or more air temperatures, or both.

A7. The thermal system of any of A1-A6, wherein the exhaust loop includes a bypass line for selectively connecting the exhaust heat exchanger to the heat pump to bypass the BHE.

A8. The thermal system of A7, further including a bypass fluid distribution device for selectively directing the downhole fluid to the bypass line.

A9. The thermal system of any of A1-A8, wherein the exhaust includes an air extractor for extracting at least some of the facility air from the facility as the exhaust flow.

A10. The thermal system of any of A1-A9, wherein the facility air circuit includes an air inlet for providing fresh air to the facility as an inlet flow of the facility air.

A11. The thermal system of any of A1-A10, wherein the main loop and the exhaust loop are connected in parallel to a decoupling tank of the downhole fluid circuit, wherein the decoupling tank is configured to store a thermal energy storage such that the main loop and the exhaust loop can be operated at different flowrates to exchange heat with the thermal energy storage of the decoupling tank.

A12. The thermal system of any of A1-A11, wherein the exhaust loop is configured to circulate at least some of the downhole fluid through the exhaust heat exchanger.

A13. The thermal system of any of A1-A11, further comprising an intermediate fluid circuit positioned between the exhaust loop and the exhaust heat exchanger, the intermediate loop including a loop heat exchanger and configured to transfer heat between the facility air and an intermediate working fluid at the exhaust heat exchanger and to exchange heat between the intermediate working fluid and the downhole fluid at the loop heat exchanger.

A14. The thermal system of any of A1-A13, wherein the facility air circuit is configured to exchange heat directly with the heat pump.

A15. The thermal system of any of A1-A14, further comprising facility fluid circuit for exchanging heat between the heat pump and the facility air via a facility fluid of the facility fluid circuit.

A16. The thermal system of any of A1-A15, wherein the main loop and the exhaust loop are connected in parallel to the heat pump via decoupling manifolds, and wherein the main loop and the exhaust loop each include one or more fluid distribution devices for independently controlling a flowrate of the respective loops for exchanging heat with the heat pump at independent flowrates.

A17. The thermal system of any of A1-A16, wherein the heat pump and the downhole fluid circuit comprise a ground-source heat pump, and further comprising an air-source heat pump thermally connected to the facility air circuit for exchanging heat with the facility air.

A18. The thermal system of A6, wherein the controller is configured to distribute the downhole fluid to the exhaust loop based on the downhole fluid temperature at the outlet of the exhaust loop being a threshold difference from the downhole fluid temperature at the outlet of the heat pump.

A19. The thermal system of A7, wherein the controller is configured to distribute the downhole fluid to the bypass line based on the downhole fluid temperature at the outlet of the exhaust loop being a threshold difference from the downhole fluid temperature at the outlet of the borehole heat exchanger.

B1. A method of operating a thermal system, comprising:
thermally conditioning a facility including facility air using a heat pump;
circulating a facility air through a facility air circuit to thermally condition a facility based on exchanging heat between a heat pump and the facility air;
exhausting at least some of the facility air from the facility as an exhaust flow of the facility air; and
passing the exhaust flow through an exhaust heat exchanger to exchange heat between the exhaust flow and a downhole fluid of a downhole fluid circuit to recover at least some heating or cooling of the facility air to the downhole fluid.

B2. The method of B1, further comprising circulating the downhole fluid through the downhole fluid circuit to exchange heat between the downhole fluid and the heat pump.

B3. The method of B2, further comprising circulating the downhole fluid through a borehole heat exchanger (BHE) positioned in a geological formation to exchange heat between the heat pump and the geological formation.

B4. The method of B3, further comprising circulating the downhole fluid between the exhaust heat exchanger and the heat pump to exchange heat between the exhaust flow and the heat pump.

B5. The method of B4, further comprising circulating the downhole fluid without circulating the downhole fluid in the BHE.

B6. The method of any of B2-B5, further comprising circulating the downhole fluid between the exhaust heat exchanger and the BHE to exchange heat between the exhaust flow and the geological formation.

B7. The method of B6, further comprising circulating the downhole fluid without exchanging heat at the heat pump.

B8. The method of any of B3-B7, further comprising:
circulating the downhole fluid between the exhaust heat exchanger and a decoupling tank of the downhole fluid circuit at a first flowrate to exchange a first heat between the exhaust flow and an energy storage of the decoupling tank;
circulating the downhole fluid between the BHE and the decoupling tank at a second flow rate to exchange a second heat between the geological formation and the energy storage of the decoupling tank; and
circulating the downhole fluid between the decoupling tank and the heat pump to exchange a third heat between the energy storage of the decoupling tank and the heat pump.

B9. The method of any of B1-B8, wherein thermally conditioning the facility includes exchanging heat directly between the facility air and the heat pump.

B10. The method of any of B1-B8, wherein thermally conditioning the facility includes exchanging heat between the facility air and the heat pump with a facility fluid between the heat pump and the facility air.

C1. A thermal system for providing thermal conditioning to a facility, including:
a facility air circuit for circulating a facility air throughout the facility, the facility air circuit being thermally connected to a heat pump for exchanging heat with the facility air; and
a downhole fluid circuit for circulating a downhole fluid, comprising:
the heat pump for exchanging heat with the downhole fluid;
a borehole heat exchanger (BHE) for exchanging heat between the downhole fluid and a geological formation; and
an exhaust heat exchanger coupled to an exhaust of the facility air circuit and configured to exchange heat between the downhole fluid and an exhaust flow of the facility air exhausted from the facility at the exhaust;
wherein the downhole fluid circuit is configured to operate in a plurality of modes, including:
a first mode for exchanging heat between the geological formation via the BHE and the heat pump;
a second mode for exchanging heat between the exhaust flow via the exhaust heat exchanger, the geological formation via the BHE, and the heat pump;
a third mode for exchanging heat between the exhaust flow via the exhaust heat exchanger and the geological formation via the BHE; and
a fourth mode for exchanging heat between the exhaust flow via the exhaust heat exchanger and the heat pump.

D1. A heating and cooling system for a building including:
a. a downhole fluid circuit for circulating a downhole fluid and including a heat pump and a borehole heat exchanger, wherein the heat pump is fluidly connected to a building fluid circuit circulating in the building and is configured to exchange calories between the building fluid circuit and the downhole fluid circuit,
b. an air extraction installation for extracting air from the building,
c. an extraction heat exchanger fluidly connected to the downhole fluid circuit and the air extraction installation.

D2. The heating and cooling system of D1, wherein the downhole fluid circuit includes a main loop comprising the heat pump and the borehole heat exchanger and at least a derivation line including the extraction heat exchanger.

D3 The heating and cooling system of D1 or D2, wherein the downhole fluid circuit includes a fluid distribution device, such as a three-way valve or a fluid circulation pump or a combination thereof, associated to the derivation line to distribute the downhole fluid between the main loop and the derivation line.

D4. The heating and cooling system of any of D2-D3, comprising one or more first sensors for sensing temperature of the downhole fluid at one or more of the inlet of the borehole heat exchanger, the outlet of the borehole heat exchanger, the inlet of the heat pump and the outlet of the heat pump and a second sensor for sensing a temperature of the extracted air and a controller for controlling the fluid distribution device based on the feedback of at least one of the one or more sensor and of the second sensor, and optionally based on the building heat demand.

D5. The heating and cooling system of any of D1-D4, wherein the downhole fluid circuit is configured so that the downhole fluid flows in the heat exchanger between a heat pump outlet and a borehole heat exchanger inlet.

D6. The heating and cooling system of any D2-D5, wherein the at least one derivation line extends between a first derivation point of the main loop downstream of an outlet of the heat pump and a second derivation point of the main loop downstream of the first derivation point and upstream of an inlet of the borehole heat exchanger.

D7. The heating and cooling system of any of D1-D6, wherein the downhole fluid circuit includes a three-way valve at the first derivation point to distribute the downhole fluid between the main loop and the derivation line.

D8. The heating and cooling system of D6 or D7, wherein the downhole fluid circuit includes a by-pass line between a third derivation point in the derivation line, downstream of the extraction heat exchanger, and a fourth derivation point in the main loop downstream of an outlet of the borehole heat exchanger and upstream of an inlet of the heat pump.

D9. The heating and cooling system of any of D1-D8 preceding claim, wherein the fluid distribution device is a first fluid distribution device, wherein the downhole fluid circuit includes a second fluid distribution device, such as a three-way valve or a fluid circulation pump, associated to the bypass line to distribute the downhole fluid between the derivation line and the bypass line.

D10. The heating and cooling system of any of D1-D9, wherein the second fluid distribution device includes a three-port valve at the third derivation point to distribute the downhole fluid between the main loop and the bypass line.

D11. The heating and cooling system of any of D1-D10, comprising at least a third sensor for sensing temperature of the downhole fluid at one or more of the outlet of the borehole heat exchanger, the inlet of the heat pump, and a fourth sensor for sensing temperature of the downhole fluid in the derivation line and a controller for controlling the second fluid distribution device based on the feedback of at least the third and the fourth sensor, optionally based on the building need.

D12. The heating and cooling system of any of D1-D11, wherein the downhole fluid circuit is configured so that the downhole fluid flows in the heat exchanger between a borehole heat exchanger outlet and a borehole heat exchanger inlet, without circulating in the heat pump.

D13. The heating and cooling system of D12, wherein the derivation line extends between a first derivation point downstream of an outlet of the borehole heat exchanger and upstream of an inlet of the heat pump and a second derivation point upstream of an inlet of the borehole heat exchanger and downstream of an outlet of the heat pump.

D14. The heating and cooling system of any of D1-D13, further including an air suction installation for sucking air from the outside in the building and an suction heat exchanger fluidly connected to the downhole fluid circuit and the air suction installation.

D15. The heating and cooling system of any of D1-D14, wherein the derivation line is a first derivation line and wherein the downhole fluid circuit includes at least a second derivation line including the suction heat exchanger.

D16. The heating and cooling system of any of D1-D15, wherein the second derivation line extends between a fifth and sixth derivation points located either in the main loop, respectively downstream of an outlet of the borehole heat exchanger and upstream of an inlet of the heat pump and upstream of an inlet of the borehole heat exchanger and downstream of an outlet of the heat pump, or in the first derivation line, respectively upstream and downstream of the extraction heat exchanger.

D17. The heating and cooling system of any of D1-D16, wherein the fluid distribution device is a first fluid distribution device, wherein the downhole fluid circuit includes a third fluid distribution device, such as a three-port valve or a fluid circulation pump, associated to the second derivation line to distribute the downhole fluid between the second derivation line and at least one of the main loop and the first derivation line.

D18. The heating and cooling system of any of D1-D17, comprising one or more fifth sensors for sensing temperature of the downhole fluid at one or more of the inlet of the borehole heat exchanger, the outlet of the borehole heat exchanger, the inlet of the heat pump and the outlet of the heat pump and a sixth sensor for sensing a temperature of the sucked air and a controller for controlling the third fluid distribution device based on the feedback of at least one of the fifth and sixth sensor, and optionally based on a building demand.

D19. The heating and cooling system of any of D14-D18, wherein the building fluid circuit includes the air suction installation.

D20. The heating and cooling system of D19, wherein the air suction installation is fluidly connected to the heat pump.

D21. The heating and cooling system of D20, wherein the suction heat exchanger is upstream of the heat pump in the building fluid circuit.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that is within standard manufacturing or process tolerances, or which still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements. Additionally, as used herein, the term "and/or" includes any and all combinations of one or more of the associated listed items.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A thermal system for providing thermal conditioning to a facility, including:
    a facility air circuit for circulating a facility air throughout the facility, the facility air circuit including a plurality of heat exchangers disposed within the facility, the plurality of heat exchangers configured to exchange heat between the facility air and a heat pump; and
    a facility fluid circuit for circulating a facility fluid through the plurality of heat exchangers and the heat pump to exchange heat between the facility air and the heat pump, the facility fluid circuit including a buffer tank, the buffer tank operating in parallel with the heat pump such that the facility fluid circulates from the plurality of heat exchangers into the buffer tank, the facility fluid flows from the buffer tank to the heat pump, the facility fluid circulates from the heat pump back into the buffer tank, and the facility fluid circulates from the buffer tank back into the plurality of heat exchangers; and
    a downhole fluid circuit for circulating a downhole fluid, comprising:
        the heat pump for exchanging heat with the downhole fluid;
        a main loop, including a borehole heat exchanger (BHE) for exchanging heat between the downhole fluid and a geological formation; and
        an exhaust loop including an exhaust heat exchanger coupled to the exhaust of the facility air circuit, wherein the exhaust loop is configured to exchange heat between the downhole fluid and an exhaust flow of the facility air exhausted from the facility at the exhaust.

2. The thermal system of claim 1, wherein the exhaust loop is configured to circulate at least some of the downhole fluid to the exhaust heat exchanger.

3. The thermal system of claim 1, further comprising a fluid distribution device included in the downhole fluid circuit for distributing the downhole fluid between the main loop and the exhaust loop, wherein the fluid distribution device includes one or more of an actuatable valve or a pump.

4. The thermal system of claim 3, wherein the fluid distribution device is configured to dynamically modulate the circulation of the downhole fluid such that a portion of the downhole fluid flows to the exhaust loop and a portion of the downhole fluid flows through the main loop.

5. The thermal system of claim 3, further comprising:
    one or more downhole temperature sensors for measuring one or more downhole fluid temperatures at one or more of an inlet of the BHE, an outlet of the BHE, an inlet of the heat pump, an outlet of the heat pump, an inlet of the exhaust loop, or an outlet of the exhaust loop;
    one or more air temperature sensors for measuring one or more air temperatures of one or more of an inlet of the exhaust heat exchanger, or an outlet of the exhaust heat exchanger; and
    a controller for controlling the fluid distribution device to distribute the downhole fluid between the exhaust loop and the BHE based on the one or more downhole fluid temperatures, the one or more air temperatures, or both.

6. The thermal system of claim 5, wherein the controller is configured to distribute the downhole fluid to the exhaust loop based on the downhole fluid temperature at the outlet of the exhaust loop being a threshold difference from the downhole fluid temperature at the outlet of the heat pump.

7. The thermal system of claim 1, wherein the exhaust heat exchanger is connected to the main loop via the exhaust loop in series between an outlet of the heat pump and an inlet of the BHE such that the downhole fluid flows from the outlet of the heat pump, through the exhaust heat exchanger via the exhaust loop, and to the inlet of the BHE.

8. The thermal system of claim 1, wherein the exhaust loop includes a bypass line for selectively connecting the exhaust heat exchanger to the heat pump to bypass the BHE, and wherein the bypass line includes a bypass fluid distribution device for selectively directing the downhole fluid to the bypass line.

\* \* \* \* \*